(12) United States Patent
Li et al.

(10) Patent No.: US 12,335,793 B2
(45) Date of Patent: *Jun. 17, 2025

(54) MOBILITY MANAGEMENT METHOD, TERMINAL, AND BASE STATION

(71) Applicant: HUAWEI TECHNOLOGIES CO., LTD., Guangdong (CN)

(72) Inventors: Bingzhao Li, Beijing (CN); Wei Quan, Beijing (CN); Jian Zhang, Shenzhen (CN); Weihua Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 169 days.

This patent is subject to a terminal disclaimer.

(21) Appl. No.: 17/886,306

(22) Filed: Aug. 11, 2022

(65) Prior Publication Data

US 2022/0386184 A1 Dec. 1, 2022

Related U.S. Application Data

(63) Continuation of application No. 16/025,659, filed on Jul. 2, 2018, now Pat. No. 11,589,272, which is a
(Continued)

(30) Foreign Application Priority Data

Dec. 31, 2015 (WO) ................ PCT/CN2015/100336

(51) Int. Cl.
*H04W 36/00* (2009.01)
*H04W 48/10* (2009.01)
(Continued)

(52) U.S. Cl.
CPC ....... *H04W 36/0033* (2013.01); *H04W 48/10* (2013.01); *H04W 52/0209* (2013.01);
(Continued)

(58) Field of Classification Search
CPC . H04W 36/0033; H04W 76/20; H04W 76/27; H04W 48/10; H04W 52/0209;
(Continued)

(56) References Cited

U.S. PATENT DOCUMENTS 9,253,705 B1   2/2016 Pawar et al.
2005/0124344 A1 6/2005 Laroia et al.
(Continued)

FOREIGN PATENT DOCUMENTS

CN   101626565 A   1/2010
CN   101668280 A   3/2010
(Continued)

OTHER PUBLICATIONS

3GPP TR 23.720 V1.2.0(Nov. 2015);3rd Generation Partnership Project;Technical Specification Group Services and System Aspects;Architecture enhancements for Cellular Internet of Things(Release 13);total 96 pages.
(Continued)

*Primary Examiner* — Jackie Zuniga Abad
*Assistant Examiner* — Latresa A McCallum

(57) ABSTRACT

Embodiments of the present invention disclose a mobility management method, user equipment, and a base station. The mobility management method may include: receiving, by user equipment UE in a connected mode, a source identifier of the UE from a first base station, where the source identifier is used to uniquely identify the UE in the first base station; entering, by the UE, a low-overhead state after a low-overhead activation condition is satisfied, where in the low-overhead state, the UE stores a connection context of the UE in the connected mode, and camps on a cell according to a cell reselection criterion during movement; and reporting, by the UE when a first preset condition is satisfied, the source identifier to a second base station to
(Continued)

which a second cell belongs, where the second cell is a serving cell on which the UE currently camps.

18 Claims, 10 Drawing Sheets

Related U.S. Application Data continuation of application No. PCT/CN2016/078165, filed on Mar. 31, 2016.

(51) Int. Cl.
    *H04W 52/02*     (2009.01)
    *H04W 76/20*     (2018.01)
    *H04W 76/27*     (2018.01)
    *H04W 76/19*     (2018.01)

(52) U.S. Cl.
    CPC ........... *H04W 76/20* (2018.02); *H04W 76/27* (2018.02); *H04W 36/0061* (2013.01); *H04W 76/19* (2018.02)

(58) Field of Classification Search
    CPC ............. H04W 76/19; H04W 36/0061; H04W 36/0005; H04W 36/0011; H04W 36/0055; H04W 36/08; H04W 4/02; H04W 76/11; H04W 76/28; Y02D 30/70
    See application file for complete search history.

(56) References Cited

U.S. PATENT DOCUMENTS

| | | | |
|---|---|---|---|
| 2008/0233963 A1 | 9/2008 | Alanara et al. | |
| 2009/0264132 A1 | 10/2009 | Tajima et al. | |
| 2009/0316657 A1 | 12/2009 | Singh et al. | |
| 2010/0130205 A1* | 5/2010 | Jung | H04W 36/0066 |
| | | | 455/435.2 |
| 2010/0311420 A1 | 12/2010 | Reza et al. | |
| 2011/0103277 A1 | 5/2011 | Watfa et al. | |
| 2012/0003977 A1 | 1/2012 | Iwamura et al. | |
| 2012/0135701 A1 | 5/2012 | Zhu et al. | |
| 2012/0243417 A1 | 9/2012 | Henttonen et al. | |
| 2012/0257602 A1 | 10/2012 | Takahashi et al. | |
| 2013/0122922 A1 | 5/2013 | Cho et al. | |
| 2013/0196713 A1 | 8/2013 | Anbe | |
| 2013/0208699 A1 | 8/2013 | Hakkinen et al. | |
| 2013/0229931 A1 | 9/2013 | Kim | |
| 2013/0260811 A1 | 10/2013 | Rayavarapu | |
| 2013/0331105 A1 | 12/2013 | Olofsson et al. | |
| 2014/0086126 A1* | 3/2014 | Park | H04W 52/0206 |
| | | | 370/311 |
| 2014/0179325 A1 | 6/2014 | Xu et al. | |
| 2014/0274000 A1 | 9/2014 | Gosselin et al. | |
| 2014/0274038 A1 | 9/2014 | Singhal et al. | |
| 2014/0286315 A1 | 9/2014 | Chen et al. | |
| 2014/0370915 A1 | 12/2014 | Jung et al. | |
| 2015/0079991 A1 | 3/2015 | Koskinen et al. | |
| 2015/0140983 A1 | 5/2015 | Cosimini et al. | |
| 2015/0146530 A1* | 5/2015 | Jung | H04W 24/10 |
| | | | 370/235 |
| 2015/0195755 A1 | 7/2015 | Gulati et al. | |
| 2015/0215868 A1 | 7/2015 | Xu | |
| 2015/0215894 A1 | 7/2015 | Hayashi | |
| 2015/0271783 A1 | 9/2015 | Hu et al. | |
| 2015/0327240 A1 | 11/2015 | Yamada et al. | |
| 2016/0135247 A1 | 5/2016 | Ozturk et al. | |
| 2016/0142951 A1 | 5/2016 | Balasubramanian et al. | |
| 2016/0165490 A1 | 6/2016 | Nagasaka et al. | |
| 2016/0278160 A1 | 9/2016 | Schliwa-Bertling et al. | |
| 2016/0345243 A1 | 11/2016 | Zaus et al. | |
| 2017/0019809 A1 | 1/2017 | Saikusa | |
| 2017/0171786 A1 | 6/2017 | Mochizuki et al. | |
| 2018/0192426 A1* | 7/2018 | Ryoo | H04W 72/0453 |

FOREIGN PATENT DOCUMENTS

| | | |
|---|---|---|
| CN | 101686517 A | 3/2010 |
| CN | 101861743 A | 10/2010 |
| CN | 102170626 A | 8/2011 |
| CN | 102300309 A | 12/2011 |
| CN | 102369741 A | 3/2012 |
| CN | 102469548 A | 5/2012 |
| CN | 102754495 A | 10/2012 |
| CN | 103188750 A | 7/2013 |
| CN | 103444252 A | 12/2013 |
| CN | 103686955 A | 3/2014 |
| CN | 103687055 A | 3/2014 |
| CN | 103716771 A | 4/2014 |
| CN | 103797849 A | 5/2014 |
| CN | 103906152 A | 7/2014 |
| CN | 104144524 A | 11/2014 |
| CN | 104145508 A | 11/2014 |
| CN | 104247553 A | 12/2014 |
| CN | 104427565 A | 3/2015 |
| CN | 104754759 A | 7/2015 |
| CN | 102860116 B | 3/2016 |
| EP | 2645803 A1 | 10/2013 |
| EP | 2645804 A1 | 10/2013 |
| EP | 2621222 B1 | 12/2015 |
| EP | 2196059 B1 | 10/2018 |
| JP | 2007036541 A | 2/2007 |
| JP | 2010199632 A | 9/2010 |
| JP | 2011009798 A | 1/2011 |
| JP | 2013504234 A | 2/2013 |
| JP | 2013157723 A | 8/2013 |
| RU | 2469503 C2 | 12/2012 |
| WO | 2007088381 A1 | 8/2007 |
| WO | 2007095473 A1 | 8/2007 |
| WO | 2011035719 A1 | 3/2011 |
| WO | 2012131568 A2 | 10/2012 |
| WO | 2013016842 A1 | 2/2013 |
| WO | 2013144613 A1 | 10/2013 |
| WO | 2013189348 A2 | 12/2013 |
| WO | 2014030274 A1 | 2/2014 |
| WO | 2014175967 A1 | 10/2014 |
| WO | 2014183833 A1 | 11/2014 |
| WO | 2015014560 A1 | 2/2015 |
| WO | 2015020179 A1 | 2/2015 |
| WO | 2015136893 A1 | 9/2015 |
| WO | 2015196691 A1 | 12/2015 |

OTHER PUBLICATIONS

NTT Docomo, Inc., Work on user plane based solution with AS information stored in RAN[online], 3GPP TSG-RAN WG2#92 R2-156424, Nov. 20, 2015, Internet, total 13 pages.

Ericsson, RRC Connection Suspend and Resume[online], 3GPP TSG-RAN WG2#92R2-156395, Nov. 20, 2015, Internet URL:http://www.3gpp.org/ftp/tsg_ran/WG2_RL2/TSGR2_92/Docs/R2-156395.zip,total 12 pages.

XP051046169 3GPP TR 23.720 V1.1.0(Oct. 2015),3rd Generation Partnership Project;Technical Specification Group Services and System Aspects;Architecture enhancements for Cellular Internet of Things(Release 13),total 90 pages.

3GPP TS 36.331 V12.7.0 (Sep. 2015),3rd Generation Partnership Project;Technical Specification Group Radio Access Network;Evolved Universal Terrestrial Radio Access (E-UTRA);Radio Resource Control (RRC);Protocol specification (Release 12),total 453 pages.

3GPP TS 36.300 V13.1.0 (Sep. 2015),3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13),dated Sep. 2015,total 254 pages.

3GPP TS 36.423 V13.2.0 (Dec. 2015),3rd Generation Partnership Project;Technical Specification Group Radio Access Network;Evolved Universal Terrestrial Radio Access Network(E-UTRAN);X2 application protocol (X2AP)(Release 13), total 230 pages.

3GPP TS 36.101 V13.1.0 (Oct. 2015), 3rd Generation Partnership Project;Technical Specification Group Radio Access Network;Evolved

(56) References Cited

OTHER PUBLICATIONS

Universal Terrestrial Radio Access (E-UTRA);User Equipment (UE) radio transmission and reception (Release 13),total 762 pages.

3GPP TS 24.301 V13.4.0 (Dec. 2015),3rd Generation Partnership Project; Technical Specification Group Core Network and Terminals;Non-Access-Stratum (NAS) protocol for Evolved Packet System (EPS); Stage 3(Release 13),total 401 pages.

Huawei, HiSilicon, Introduction of UE power saving mode. 3GPP TSG-CT WG1 Meeting #86, Guangzhou, P.R of China, Jan. 20-24, 2014, C1-140286, 39 pages.

3GPP TS 36.321 V12.8.0 (Dec. 2015);3rd Generation Partnership Project;Technical Specification Group Radio Access Network;Evolved Universal Terrestrial Radio Access (E-UTRA);Medium Access Control (MAC) protocol specification (Release 12);total 77 pages.

Interim Editor (Nortel),"Merged UTRAN Architecture Description V0.0.2",TSG-RAN Working Group 3 meeting #2 TSGW3#2(99)147,Nyn shamn, Sweden, Mar. 15-19, 1999, Total 56 Pages.

\* cited by examiner

MOBILITY MANAGEMENT METHOD, TERMINAL, AND BASE STATION

CROSS-REFERENCE TO RELATED APPLICATIONS

This application is a continuation of U.S. Pat. No. 11,589,272B2, filed on Jul. 2, 2018, which is a continuation of international application No. PCT/CN2016/078165, filed on Mar. 31, 2016. The International Application claims priority to international Patent Application No. PCT/CN2015/100336, filed on Dec. 31, 2015. All of the aforementioned application are hereby incorporated by reference in their entireties.

TECHNICAL FIELD

Embodiments of the present invention relate to the communications field, and more specifically, to a mobility management method, a terminal, and a base station.

BACKGROUND

Mobility management is important in a wireless mobile communications system. Mobility management may generally include mobile network handover, cell reselection, and the like of user equipment (UE).

In a Long Term Evolution (LTE)/LTE-Advanced (LTE-A) system of the 3rd Generation Partnership Project (3GPP), UE includes UE in an idle mode and UE in a connected mode. The UE in the idle mode is not connected to a base station, and cannot send data; and performs cell reselection during movement. If the UE in this mode needs to send data, the UE first needs to switch to the connected mode. The UE in the idle mode may enter the connected mode after obtaining a connection context and a dedicated intra-cell UE identifier by using a radio resource control (RRC) connection setup procedure. The UE in the connected mode is connected to a base station, and can send data; and performs a handover during movement. The UE in the connected mode may enter the idle mode by using an RRC connection release procedure.

A typical handover procedure of the UE in the connected mode may include the following key steps: A source base station, that is, a current serving base station of the UE, configures a measurement parameter for the UE. The UE performs measurement and reports a measurement result to the source base station. The source base station sends a handover request to a target base station, and after receiving an acknowledgment from the target base station, sends a handover command to the UE. The UE accesses the target base station, implements uplink synchronization, and sends a handover complete message and the like.

During future network evolution, networks are deployed in more forms, such as a heterogeneous network, coordinated multipoint (CoMP) transmission, small cell networking, and dense small cell networking. These network deployment forms pose a new challenge to UE mobility management. If a current handover procedure is still used, the UE needs to constantly perform measurement and reporting, leading to huge handover signaling overheads and radio resource waste.

SUMMARY

To resolve the foregoing technical problems, embodiments of the present invention provide a mobility management method, a terminal, and a base station, so as to resolve prior-art problems of handover signaling overheads and radio resource waste that are caused during movement by frequent handovers of UE in a connected mode that does not need to transmit data.

According to a first aspect, an embodiment of the present invention provides a mobility management method, where the method may include:
  allocating, by a first base station to which a first cell belongs (a cell service area having coverage provided by the base station), a source identifier to a terminal in a connected mode in the first cell, where the source identifier includes a first terminal identifier that identifies the terminal in the first base station; and
  storing a connection context of the terminal in the connected mode after it is determined that the terminal enters a low-overhead state, where the terminal enters the low-overhead state when a preset activation condition is satisfied, and in the low-overhead state, the terminal stores the connection context, and camps on a cell according to a cell reselection criterion during movement.

According to the mobility management method in this embodiment, after the terminal enters the low-overhead state, the first base station does not need to frequently participate in handover procedures during movement of the terminal, and stores the connection context of the terminal, so that the connection context can be transferred anytime when the terminal needs to transmit data, thereby reducing communication resources of a network device and improving network communication efficiency.

In a possible design, the allocating, by a first base station to which a first cell belongs, a source identifier to a terminal in a connected mode in the first cell includes:
  allocating, by the first base station to which the first cell belongs, the source identifier to the terminal in the connected mode in the first cell by using a cell broadcast message or a dedicated message or in a random access channel RACH procedure.

In a possible design, the preset activation condition includes at least one of the following conditions:
  the first base station sends, to the terminal, a control instruction used to instruct the terminal to enter the low-overhead state;
  no data has been transmitted between the first base station and the terminal within first preset duration;
  the first base station determines that a timing advance timer TA timer of the terminal expires, or the first base station determines that a TA timer of the terminal expires and the TA timer has not run again within second preset duration; or
  the first base station determines that the terminal enters a discontinuous reception DRX state, and has not exited the DRX state within third preset duration.

In a possible design, after the determining that the terminal enters a low-overhead state, the method further includes:
  sending, by the first base station, radio resource control RRC configuration information to the terminal for use by the terminal in the low-overhead state.

In a possible design, the RRC configuration information includes an RRC configuration index, and the configuration index is used to indicate the RRC configuration information.

In a possible design, after the determining that the terminal enters a low-overhead state, the method further includes:
  receiving, by the first base station, a notification message sent by a second base station to which a second cell belongs, where the notification message carries the source identifier of the terminal and a second cell identifier of the second cell in which the terminal is currently located, and the second cell is a serving cell on which the terminal currently camps; and determining, by the first base station according to the source identifier and the second cell identifier, that the serving cell on which the terminal currently camps is the second cell.

In a possible design, after the determining, by the first base station according to the source identifier and the second cell identifier, that the serving cell on which the terminal currently camps is the second cell, the method further includes:

sending, by the first base station, the connection context and the source identifier of the terminal to the second base station when downlink data of the terminal arrives at the first base station, where the second base station is a base station to which the second cell belongs.

According to the mobility management method in this embodiment, after the terminal enters the low-overhead state, the first base station does not need to frequently participate in handover procedures during movement of the terminal, thereby reducing communication resources of a network device. When the base station needs to send downlink data to the terminal, the base station can actively hand over, according to location information reported by the terminal to a network, the context of the terminal to the base station in which the terminal is currently located, thereby ensuring data transmission efficiency.

In a possible design, the notification message carries verification information of the terminal, and the verification information is identity authentication information generated by the terminal according to the source identifier and a key that is included in the connection context; and after the receiving, by the first base station, a notification message sent by the second base station, the method further includes:

determining, by the first base station according to the source identifier and the verification information, whether the terminal is valid terminal.

In a possible design, after the determining that the terminal enters a low-overhead state, the method further includes:

receiving a transfer request that is for the connection context and that is sent by the second base station to which the second cell belongs, where the transfer request carries the source identifier of the terminal, and the second cell is the cell on which the terminal currently camps; and sending the connection context to the second base station according to the source identifier carried in the transfer request.

In a possible design, after the determining that the terminal enters a low-overhead state, the method further includes:

sending, by the first base station, a second paging message to a third base station when downlink data of the terminal arrives at the first base station or after a first paging message from a core network is received, where the third base station and the first base station belong to a same paging area.

In a possible design, when the downlink data of the terminal arrives at the first base station or before the first paging message from the core network is received, the method further includes:

receiving information that is about a paging parameter and that is sent by the core network, where the paging parameter includes a paging index of the terminal or a DRX cycle of the terminal, and the paging parameter is used to calculate a paging offset of the terminal.

In a possible design, the second paging message includes a paging parameter, a TMSI, and/or the source identifier of the terminal, and the paging parameter includes a paging index of the terminal and/or a DRX cycle of the terminal.

In a possible design, after the sending, by the first base station, a second paging message to a third base station, the method further includes:

receiving a paging response message sent by the third base station, and determining, according to the paging response message, that the terminal is currently located in the third base station.

In a possible design, the method further includes:

sending, by the first base station to the terminal, an indication that access of the terminal in the low-overhead state is allowed; or sending, by the first base station to the terminal, a source identifier type that the terminal in the low-overhead state is allowed to report, where the source identifier type includes a short source identifier or a long source identifier; or allocating, by the first base station to which the first cell belongs, a short source identifier and a long source identifier to a terminal in the connected mode in the first cell.

According to the mobility management method in this embodiment, after the terminal enters the low-overhead state, the first base station does not need to frequently participate in handover procedures during movement of the terminal, thereby reducing communication resources of a network device. When the terminal needs to send uplink data to the current serving base station, the terminal can request, according to the source identifier reported by the terminal to a network, to hand over the context of the terminal to the base station in which the terminal is currently located, thereby ensuring data transmission efficiency.

According to a second aspect, an embodiment of the present invention provides a mobility management method, where the method may include:

receiving, by a terminal in a connected mode in a first cell, a source identifier that is allocated by a first base station to which a first cell belongs, where the source identifier includes a first terminal identifier that uniquely identifies the terminal in a cell of the first base station;

entering, by the terminal, a low-overhead state when a preset activation condition is satisfied, where in the low-overhead state, the terminal stores a connection context of the terminal in the connected mode, and camps on a cell according to a cell reselection criterion during movement; and reporting, by the terminal when a first preset condition is satisfied, the source identifier to a second base station to which a second cell belongs, where the second cell is a serving cell on which the terminal currently camps.

According to the mobility management method in this embodiment, the terminal autonomously performs mobility based on cell reselection after the terminal enters the low-overhead state, and reports only location change information of the terminal, thereby simplifying a handover procedure and reducing communication resources of a network device. When the terminal needs to perform data communication with the network device, the terminal may send a notification to a network, so that the network hands over the context of the terminal to the first base station in which the terminal is currently located, thereby ensuring data transmission efficiency.

In a possible design, the preset activation condition includes at least one of the following conditions:

the terminal receives, from the first base station, a control instruction used to instruct to enter the low-overhead state;

the terminal leaves the first cell;

no data has been transmitted between the terminal and the first base station within first preset duration;

a timing advance timer TA timer of the terminal expires, or a TA timer of the terminal expires and the TA timer has not run again within second preset duration; or the terminal enters a discontinuous reception DRX state, and has not exited the DRX state within third preset duration.

In a possible design, after the entering, by the terminal, a low-overhead state when a preset activation condition is satisfied, the method further includes:

exiting, by the terminal, the low-overhead state when a second preset condition is satisfied, where the second preset condition includes:

the serving cell on which the terminal currently camps changes; or the serving cell on which the terminal currently camps goes beyond a specified cell set range; or the serving cell on which the terminal currently camps and the first cell do not belong to a same preset area or a same base station; or the terminal sends the source identifier to the second base station and receives an access reject indication for the source identifier from the second base station; or the terminal reads a system information broadcast of the second cell, and the system information broadcast does not carry an indication that access of the terminal in the low-overhead state is allowed; or the terminal needs to send uplink data.

In a possible design, the exiting, by the terminal, the low-overhead state when a second preset condition is satisfied includes: clearing, by the terminal, the connection context and entering an idle mode when the second preset condition is satisfied.

In a possible design, the first preset condition includes:

the serving cell on which the terminal currently camps changes; or the second cell on which the terminal currently camps goes beyond the specified cell set range; or the second cell on which the terminal currently camps and the first cell do not belong to a same preset area or a same base station; or the terminal needs to send uplink data.

In a possible design, before the reporting, by the terminal when a first preset condition is satisfied, the source identifier to a second base station to which a second cell belongs, the method includes:

receiving and reading, by the terminal, a system information broadcast of the second cell; and if the system information broadcast carries an indication that access of the terminal in the low-overhead state is allowed, determining, by the terminal according to the access indication, to send the source identifier to the second base station; or determining, by the terminal according to indication information sent by the second base station, to report a long source identifier or a short source identifier, where the long source identifier and the short source identifier may be two independent source identifiers, or the short source identifier is partial information of the long source identifier.

In a possible design, when the first preset condition is satisfied, the indication information of the second base station is indication information configured by using a system broadcast or is authorization information sent to the terminal by using an authorization command, and the determining, by the terminal according to indication information sent by the second base station, to report a long source identifier or a short source identifier includes:

determining, by the terminal according to an indication in the indication information configured by using the system broadcast, a source identifier type used to report the source identifier; or determining, by the terminal according to the authorization information, a size of a message that can be transmitted, and choosing, according to the size of the message that can be transmitted, to use the long source identifier or the short source identifier.

In a possible design, before the reporting, by the terminal when a first preset condition is satisfied, the source identifier to a second base station to which a second cell belongs, the method further includes:

sending, by the terminal, a random access preamble within a preset range to the second base station, where the random access preamble within the preset range is used to indicate that the source identifier needs to be sent to the second base station or a message of a length that is greater than a preset length threshold needs to be sent to the second base station;

receiving a preset-size transmission resource that is allocated by the second base station and that is used to transmit the source identifier; and sending the source identifier to the second base station by using the transmission resource.

In a possible design, the random access preamble within the preset range is a predefined preamble or a received preamble configured by the second base station.

In a possible design, the reporting, by the terminal, the source identifier to a second base station to which a second cell belongs includes:

sending, by the terminal, a random access preamble to the second base station;

receiving a dedicated terminal identifier sent by the second base station and a transmission resource that is sent by the second base station, allocated according to the random access preamble, and used to transmit the source identifier, where the dedicated terminal identifier is an identifier that uniquely identifies the terminal in the second cell;

sending the source identifier to the second base station by using the transmission resource;

receiving acknowledgment information that is sent by the second base station and that includes the source identifier; and determining, according to the acknowledgment information, whether to apply the dedicated terminal identifier.

In a possible design, the determining, according to the acknowledgment information, whether to apply the dedicated terminal identifier includes:

skipping applying, by the terminal, the dedicated terminal identifier according to the acknowledgment information; or applying, by the terminal, the dedicated terminal identifier according to the acknowledgment information, and exiting the low-overhead state; or applying, by the terminal, the dedicated terminal identifier according to the acknowledgment information, and remaining in the low-overhead state; or applying, by the terminal, the dedicated terminal identifier and exiting the low-overhead state according to an instruction that is carried in the acknowledgment information and that is used to instruct the terminal to exit the low-overhead state.

In a possible design, after the applying, by the terminal, the dedicated terminal identifier, the method includes:
updating a key in the connection context according to a cell identifier of the currently camped serving cell.

In a possible design, the source identifier further includes verification information, and the verification information is identity authentication information generated by the terminal according to the source identifier and an updated key.

In a possible design, after the entering, by the terminal, a low-overhead state when a preset activation condition is satisfied, the method further includes:
performing, by the terminal, paging listening by using the source identifier.

In a possible design, after the entering, by the terminal, a low-overhead state when a preset activation condition is satisfied, the method further includes:
receiving radio resource control RRC configuration information sent by the first base station, where the RRC configuration information includes an RRC configuration index, and the configuration index is used to indicate the RRC configuration information; and
using, by the terminal, the RRC configuration information in the low-overhead state.

In a possible design, the reporting, by the terminal when a first preset condition is satisfied, the source identifier to a second base station to which a second cell belongs includes:
reporting, by the terminal, the source identifier including the RRC configuration index to the second base station to which the second cell belongs, so that the second base station determines, according to the RRC configuration index, the RRC configuration information used by the terminal.

In a possible design, the first preset condition is that the terminal needs to send uplink data, and the reporting, by the terminal, the source identifier to a second base station to which a second cell belongs further includes:
reporting, by the terminal when or after reporting the source identifier, an uplink data indication to the second base station to which the second cell belongs.

According to a third aspect, an embodiment of the present invention provides a mobility management method, where the method may include:
receiving, by a second base station to which a second cell belongs, a source identifier that is reported by a terminal in a low-overhead state, where in the low-overhead state, the terminal stores a connection context of the terminal in a connected mode, and camps on a cell according to a cell reselection criterion during movement, a first cell is a serving cell when the terminal enters the low-overhead state, the second cell is a current serving cell of the terminal, and the source identifier includes a first terminal identifier that identifies the terminal in a first base station to which the first cell belongs; and
sending the first terminal identifier to the first base station according to the source identifier, to notify the first base station that the current serving cell of the terminal is the second cell.

According to the mobility management method in this embodiment, after the terminal enters the low-overhead state, a network device does not need to frequently participate in handover procedures during movement of the terminal, thereby reducing communication resources of the network device. When the network device needs to perform data communication with the terminal, the network device hands over, according to location information reported by the terminal to a network, the context of the terminal to the first base station in which the terminal is currently located, thereby ensuring data transmission efficiency.

In a possible design, the source identifier further includes indication information, and the indication information is used to notify the second base station that the terminal is in the low-overhead state.

In a possible design, before the receiving, by a second base station to which a second cell belongs, a source identifier that is reported by a terminal in a low-overhead state, the method includes:
sending, by the second base station, a system information broadcast, where the system information broadcast carries an indication that access of the terminal in the low-overhead state is allowed, so that the terminal determines, according to the access indication, whether to send the source identifier to the second base station.

In a possible design, before the receiving, by a second base station to which a second cell belongs, a source identifier that is reported by a terminal in a low-overhead state, the method further includes:
receiving a random access preamble sent by the terminal; and
when the random access preamble falls within a preset range, allocating a preset-size transmission resource to the terminal, so that the terminal sends the source identifier by using the transmission resource.

In a possible design, the random access preamble within the preset range is a predefined preamble or a received preamble configured by the second base station.

In a possible design, the receiving, by a second base station to which a second cell belongs, a source identifier that is reported by a terminal in a low-overhead state includes:
receiving, by the second base station to which the second cell belongs, a random access preamble that is sent by the terminal in the low-overhead state;
allocating, to the terminal according to the random access preamble, a dedicated terminal identifier and a transmission resource that is used to transmit the source identifier, where the dedicated terminal identifier is an identifier that uniquely identifies the terminal in the second cell;
receiving the source identifier by using the transmission resource; and
sending acknowledgment information including the source identifier to the terminal.

In a possible design, the sending acknowledgment information including the source identifier to the terminal includes:
sending, to the terminal, an acknowledgment message that includes the source identifier and that carries an instruction used to instruct the terminal to exit the low-overhead state, so that the terminal applies the dedicated terminal identifier and exits the low-overhead state according to the instruction.

In a possible design, the sending the first terminal identifier to the first base station according to the source identifier includes:
sending a notification message to the first base station according to the source identifier, where the notification message carries the source identifier of the terminal and a second cell identifier of the second cell in which the terminal is currently located, so that the first base station determines, according to the source identifier and the second cell identifier, that the serving cell on which the terminal currently camps is the second cell.

In a possible design, after the sending the first terminal identifier to the first base station according to the source identifier, the method further includes:

receiving an uplink data indication that is sent by the terminal and that includes the source identifier;

sending, by the second base station, a transfer request for the connection context to the first base station, where the connection context is a connection context that is of the terminal in the connected mode and that is stored by the first base station when the terminal enters the low-overhead state, and the transfer request of the connection context carries the source identifier of the terminal; and receiving the connection context transferred by the first base station, and establishing a connection to the terminal according to the connection context.

In a possible design, after the receiving the connection context transferred by the first base station, the method further includes:

sending a re-allocated source identifier to the terminal, where the re-allocated source identifier includes a second terminal identifier that identifies the terminal in the second base station; and sending an instruction to the terminal to instruct the terminal to exit the low-overhead state.

In a possible design, after the sending the first terminal identifier to the first base station according to the source identifier, the method further includes:

receiving the connection context and the source identifier of the terminal that are sent by the first base station; and determining configuration information of the terminal according to the received connection context and source identifier, and triggering uplink access of the terminal according to the source identifier.

In a possible design, the triggering uplink access of the terminal according to the source identifier includes:

paging the terminal by using the source identifier; or determining the dedicated terminal identifier of the terminal according to the source identifier, and sending an uplink access command to the terminal by using the dedicated terminal identifier; or determining the dedicated terminal identifier of the terminal according to the source identifier, and paging the terminal by using the dedicated terminal identifier.

In a possible design, the source identifier further includes a radio resource control RRC configuration index, and after the receiving, by a second base station to which a second cell belongs, a source identifier that is reported by a terminal in a low-overhead state, the method further includes:

determining, by the second base station according to the RRC configuration index, RRC configuration information used by the terminal.

In a possible design, the sending the first terminal identifier to the first base station according to the source identifier includes:

sending the source identifier to the first base station according to the source identifier by using an interface between the second base station and the first base station; or sending the source identifier to the first base station according to the source identifier by using a core network.

According to a fourth aspect, an embodiment of the present invention provides a base station, where the base station is a first base station, and the first base station may include: an output unit, a storage unit, and a processing unit, where the storage unit is configured to store program code, and the processing unit is configured to invoke the program code stored in the storage unit, to perform the following steps:

allocating a source identifier to a terminal in a connected mode in the first cell by using the output unit, where the source identifier includes a first terminal identifier that identifies the terminal in the first base station; and storing a connection context of the terminal in the connected mode after determining that the terminal enters a low-overhead state, where the terminal enters the low-overhead state when a preset activation condition is satisfied, and in the low-overhead state, the terminal stores the connection context, and camps on a cell according to a cell reselection criterion during movement.

In a possible design, that the processing unit is configured to allocate a source identifier to a terminal in a connected mode in the first cell by using the output unit is specifically:

allocating the source identifier to the terminal in the connected mode in the first cell by using a cell broadcast message or a dedicated message that is output by the output unit or in a random access channel RACH procedure.

In a possible design, the preset activation condition includes at least one of the following conditions:

the first base station sends, to the terminal, a control instruction used to instruct the terminal to enter the low-overhead state;

no data has been transmitted between the first base station and the terminal within first preset duration;

the first base station determines that a timing advance timer TA timer of the terminal expires, or the first base station determines that a TA timer of the terminal expires and the TA timer has not run again within second preset duration; or the first base station determines that the terminal enters a discontinuous reception DRX state, and has not exited the DRX state within third preset duration.

In a possible design, the processing unit is further configured to:

send, by using the output unit, radio resource control RRC configuration information to the terminal for use by the terminal in the low-overhead state.

In a possible design, the RRC configuration information includes an RRC configuration index, and the configuration index is used to indicate the RRC configuration information.

In a possible design, the base station further includes an input unit, and the processing unit is further configured to:

receive, by using the input unit and after determining that the terminal enters the low-overhead state, a notification message sent by a second base station to which a second cell belongs, where the notification message carries the source identifier of the terminal and a second cell identifier of the second cell in which the terminal is currently located, and the second cell is a serving cell on which the terminal currently camps; and determine, according to the source identifier and the second cell identifier, that the serving cell on which the terminal currently camps is the second cell.

In a possible design, the processing unit is further configured to:

after determining, according to the source identifier and the second cell identifier, that the serving cell on which the terminal currently camps is the second cell, send, by using the output unit, the connection context and the source identifier of the terminal to the second base station when downlink data of the terminal arrives at the first base station, where the second base station is a base station to which the second cell belongs.

In a possible design, the base station further includes the input unit; and the notification message carries verification information of the terminal, and the verification information is identity authentication information generated by the terminal according to the source identifier and a key that is included in the connection context; and the processing unit is further configured to:
after receiving, by using the input unit, the notification message sent by the second base station, determine, according to the source identifier and the verification information, whether the terminal is valid terminal.

In a possible design, the base station further includes the input unit, and the processing unit is further configured to:
receive, by using the input unit and after determining that the terminal enters the low-overhead state, a transfer request that is for the connection context and that is sent by the second base station to which the second cell belongs, where the transfer request carries the source identifier of the terminal, and the second cell is the cell on which the terminal currently camps; and
send, by using the output unit, the connection context to the second base station according to the source identifier carried in the transfer request.

In a possible design, the processing unit is further configured to:
before receiving, by using the input unit, the source identifier that is reported by the terminal in the low-overhead state, send a system information broadcast by using the output unit, where the system information broadcast carries a source identifier type that the terminal in the low-overhead state is allowed to report, so that the terminal determines, according to the source identifier type, to use a short source identifier or a long source identifier; or
before receiving, by using the input unit, the source identifier that is reported by the terminal in the low-overhead state, allocate a short source identifier and a long source identifier to the terminal by using the output unit; or
send, by using the output unit, a second paging message to a third base station when downlink data received by using the input unit arrives at the first base station or after a first paging message from a core network is received by using the input unit, where the third base station and the first base station belong to a same paging area; or
before downlink data received by using the input unit arrives at the first base station, receive, by using the input unit, information that is about a paging parameter and that is sent by a core network, where the paging parameter includes a paging index of the terminal or a DRX cycle of the terminal, and the paging parameter is used to calculate a paging offset of the terminal.

According to a fifth aspect, an embodiment of the present invention provides a terminal, where the terminal may include: an input unit, an output unit, a storage unit, and a processing unit, where the storage unit is configured to store program code, and the processing unit is configured to invoke the program code stored in the storage unit, to perform the following steps:
receiving, by using the input unit, a source identifier that is allocated by a first base station to which a first cell belongs, where the source identifier includes a first terminal identifier that uniquely identifies the terminal in a cell of the first base station;
enabling the terminal to enter a low-overhead state when a preset activation condition is satisfied, where in the low-overhead state, the terminal stores a connection context of the terminal in a connected mode, and camps on a cell according to a cell reselection criterion during movement; and
reporting, by using the output unit and when a first preset condition is satisfied, the source identifier to a second base station to which a second cell belongs, where the second cell is a serving cell on which the terminal currently camps.

In a possible design, the preset activation condition includes at least one of the following conditions:
the terminal receives, from the first base station, a control instruction used to instruct to enter the low-overhead state;
the terminal leaves the first cell;
no data has been transmitted between the terminal and the first base station within first preset duration;
a timing advance timer TA timer of the terminal expires, or a TA timer of the terminal expires and the TA timer has not run again within second preset duration; or
the terminal enters a discontinuous reception DRX state, and has not exited the DRX state within third preset duration.

In a possible design, the processing unit is further configured to:
after the terminal enters the low-overhead state when the preset activation condition is satisfied, enable the terminal to exit the low-overhead state when a second preset condition is satisfied, where
the second preset condition includes:
the serving cell on which the terminal currently camps changes; or
the serving cell on which the terminal currently camps goes beyond a specified cell set range; or
the serving cell on which the terminal currently camps and the first cell do not belong to a same preset area or a same base station; or
the terminal sends the source identifier to the second base station and receives an access reject indication for the source identifier from the second base station; or
the terminal reads a system information broadcast of the second cell, and the system information broadcast does not carry an indication that access of the terminal in the low-overhead state is allowed; or
the terminal needs to send uplink data.

In a possible design, that the processing unit is configured to enable the terminal to exit the low-overhead state when a second preset condition is satisfied is specifically: clearing the connection context and enabling the terminal to enter an idle mode when the second preset condition is satisfied.

In a possible design, the first preset condition includes:
the serving cell on which the terminal currently camps changes; or
the second cell on which the terminal currently camps goes beyond the specified cell set range; or the second cell on which the terminal currently camps and the first cell do not belong to a same preset area or a same base station; or the terminal needs to send uplink data.

In a possible design, the processing unit is further configured to:

before reporting, by using the output unit and when the first preset condition is satisfied, the source identifier to the second base station to which the second cell belongs, receive and read a system information broadcast of the second cell by using the input unit, and if the system information broadcast carries an indication that access of the terminal in the low-overhead state is allowed, determine, according to the access indication, to send the source identifier to the second base station by using the output unit.

In a possible design, the processing unit is further configured to: before reporting, by using the output unit and when the first preset condition is satisfied, the source identifier to the second base station to which the second cell belongs, send a random access preamble within a preset range to the second base station by using the output unit, where the random access preamble within the preset range is used to indicate that the source identifier needs to be sent to the second base station or a message of a length that is greater than a preset length threshold needs to be sent to the second base station;

receive, by using the input unit, a preset-size transmission resource that is allocated by the second base station and that is used to transmit the source identifier; and send, by using the output unit, the source identifier to the second base station by using the transmission resource.

In a possible design, the random access preamble within the preset range is a predefined preamble or a received preamble configured by the second base station.

In a possible design, that the processing unit is configured to report the source identifier to a second base station to which a second cell belongs is specifically:

sending a random access preamble to the second base station by using the output unit;

receiving, by using the input unit, a dedicated terminal identifier sent by the second base station and a transmission resource that is sent by the second base station, allocated according to the random access preamble, and used to transmit the source identifier, where the dedicated terminal identifier is an identifier that uniquely identifies the terminal in the second cell;

sending, by using the output unit, the source identifier to the second base station by using the transmission resource;

receiving, by using the input unit, acknowledgment information that is sent by the second base station and that includes the source identifier; and determining, according to the acknowledgment information, whether to apply the dedicated terminal identifier.

In a possible design, that the processing unit is configured to determine, according to the acknowledgment information, whether to apply the dedicated terminal identifier is specifically:

skipping applying, by the processing unit, the dedicated terminal identifier according to the acknowledgment information; or applying, by the processing unit, the dedicated terminal identifier according to the acknowledgment information, and exiting the low-overhead state; or applying, by the processing unit, the dedicated terminal identifier according to the acknowledgment information, and remaining in the low-overhead state; or applying, by the processing unit, the dedicated terminal identifier and exiting the low-overhead state according to an instruction that is carried in the acknowledgment information and that is used to instruct the terminal to exit the low-overhead state.

In a possible design, the processing unit is further configured to:

after the terminal applies the dedicated terminal identifier, update a key in the connection context according to a cell identifier of the currently camped serving cell.

In a possible design, the source identifier further includes verification information, and the verification information is identity authentication information generated by the terminal according to the source identifier and an updated key.

In a possible design, the processing unit is further configured to:

after the terminal enters the low-overhead state when the preset activation condition is satisfied, perform paging listening by using the source identifier.

In a possible design, the processing unit is further configured to:

after the terminal enters the low-overhead state when the preset activation condition is satisfied, receive, by using the input unit, radio resource control RRC configuration information sent by the first base station, where the RRC configuration information includes an RRC configuration index, and the configuration index is used to indicate the RRC configuration information; and enable the terminal to use the RRC configuration information in the low-overhead state.

In a possible design, that the processing unit is configured to report, when a first preset condition is satisfied, the source identifier to a second base station to which a second cell belongs is specifically:

reporting, by using the output unit, the source identifier including the RRC configuration index to the second base station to which the second cell belongs, so that the second base station determines, according to the RRC configuration index, the RRC configuration information used by the terminal.

In a possible design, the first preset condition is that the terminal needs to send uplink data, and that the processing unit is configured to report the source identifier to a second base station to which a second cell belongs is specifically:

reporting, by using the output unit, an uplink data indication including the source identifier to the second base station to which the second cell belongs.

In a possible design, the processing unit is configured to:

before reporting, by using the output unit and when the first preset condition is satisfied, the source identifier to the second base station to which the second cell belongs, receive and read, by using the input unit, indication information sent by the second base station, and determine, according to the indication information, a type of the source identifier that is to be sent to the second base station by using the output unit; and/or when the first preset condition is satisfied, receive, by using the input unit, a short source identifier and a long source identifier allocated by the first base station to which the first cell belongs.

In a possible design, the indication information is authorization information sent to the terminal by using an authorization command, and the processing unit is further configured to:

determine, according to the authorization information, a size of a message that can be transmitted, and choose, according to the size of the message that can be transmitted, to use the long source identifier or the short source identifier.

According to a sixth aspect, an embodiment of the present invention provides a base station, where the base station is a second base station, and the second base station may include: an input unit, an output unit, a storage unit, and a processing unit, where the storage unit is configured to store program code, and the processing unit is configured to invoke the program code stored in the storage unit, to perform the following steps:

receiving, by using the input unit, a source identifier that is reported by a terminal in a low-overhead state, where in the low-overhead state, the terminal stores a connection context of the terminal in a connected mode, and camps on a cell according to a cell reselection criterion during movement, a first cell is a serving cell when the terminal enters the low-overhead state, a second cell is a current serving cell of the terminal, and the source identifier includes a first terminal identifier that identifies the terminal in a first base station to which the first cell belongs; and sending the first terminal identifier to the first base station according to the source identifier by using the output unit, to notify the first base station that the current serving cell of the terminal is the second cell.

In a possible design, the source identifier further includes indication information, and the indication information is used to notify the second base station that the terminal is in the low-overhead state.

In a possible design, the processing unit is further configured to:

before receiving, by using the input unit, the source identifier that is reported by the terminal in the low-overhead state, send a system information broadcast by using the output unit, where the system information broadcast carries an indication that access of the terminal in the low-overhead state is allowed, so that the terminal determines, according to the access indication, whether to send the source identifier to the second base station.

In a possible design, the processing unit is further configured to: before receiving, by using the input unit, the source identifier that is reported by the terminal in the low-overhead state, receive, by using the input unit, a random access preamble sent by the terminal; and when the random access preamble falls within a preset range, allocate a preset-size transmission resource to the terminal by using the output unit, so that the terminal sends the source identifier by using the transmission resource.

In a possible design, the random access preamble within the preset range is a predefined preamble or a received preamble configured by the second base station.

In a possible design, that the processing unit is configured to receive, by using the input unit, a source identifier that is reported by a terminal in a low-overhead state is specifically:

receiving, by using the input unit, a random access preamble that is sent by the terminal in the low-overhead state;

allocating, to the terminal according to the random access preamble by using the output unit, a dedicated terminal identifier and a transmission resource that is used to transmit the source identifier, where the dedicated terminal identifier is an identifier that uniquely identifies the terminal in the second cell;

receiving, by using the input unit, the source identifier by using the transmission resource; and sending acknowledgment information including the source identifier to the terminal by using the output unit.

In a possible design, that the processing unit sends acknowledgment information including the source identifier to the terminal by using the output unit is specifically:

sending, to the terminal by using the output unit, an acknowledgment message that includes the source identifier and that carries an instruction used to instruct the terminal to exit the low-overhead state, so that the terminal applies the dedicated terminal identifier and exits the low-overhead state according to the instruction.

In a possible design, that the processing unit sends the first terminal identifier to the first base station according to the source identifier by using the output unit is specifically:

sending a notification message to the first base station according to the source identifier by using the output unit, where the notification message carries the source identifier of the terminal and a second cell identifier of the second cell in which the terminal is currently located, so that the first base station determines, according to the source identifier and the second cell identifier, that the serving cell on which the terminal currently camps is the second cell.

In a possible design, the processing unit is further configured to:

after sending the first terminal identifier to the first base station according to the source identifier by using the output unit, receive an uplink data indication that is sent by the terminal and that includes the source identifier;

send a transfer request for the connection context to the first base station by using the output unit, where the connection context is a connection context that is of the terminal in the connected mode and that is stored by the first base station when the terminal enters the low-overhead state, and the transfer request of the connection context carries the source identifier of the terminal; and receive, by using the input unit, the connection context transferred by the first base station, and establish a connection to the terminal according to the connection context.

In a possible design, the processing unit is further configured to:

after receiving, by using the input unit, the connection context transferred by the first base station, send a re-allocated source identifier to the terminal by using the output unit, where the re-allocated source identifier includes a second terminal identifier that identifies the terminal in the second base station; and send an instruction to the terminal by using the output unit to instruct the terminal to exit the low-overhead state.

In a possible design, the processing unit is further configured to:

after sending the first terminal identifier to the first base station according to the source identifier by using the output unit, receive, by using the input unit, the connection context and the source identifier of the terminal that are sent by the first base station; and determine configuration information of the terminal according to the received connection context and source identifier, and trigger uplink access of the terminal according to the source identifier.

In a possible design, that the processing unit is configured to trigger uplink access of the terminal according to the source identifier is specifically:

paging the terminal by using the source identifier; or determining the dedicated terminal identifier of the terminal according to the source identifier, and sending an uplink access command to the terminal by using the dedicated terminal identifier; or determining the dedicated terminal identifier of the terminal according to the source identifier, and paging the terminal by using the dedicated terminal identifier.

In a possible design, the source identifier further includes a radio resource control RRC configuration index, and the processing unit is further configured to:

after receiving, by using the input unit, the source identifier that is reported by the terminal in the low-overhead state, determine, according to the RRC configuration index, RRC configuration information used by the terminal.

In a possible design, that the processing unit is configured to send the first terminal identifier to the first base station according to the source identifier by using the output unit is specifically:

sending, by using the output unit, the source identifier to the first base station according to the source identifier by using an interface between the second base station and the first base station; or sending, by using the output unit, the source identifier to the first base station according to the source identifier by using a core network.

In some possible implementations of the first aspect, the second aspect, the third aspect, the fourth aspect, the fifth aspect, and the sixth aspect, the source identifier includes a first cell identifier that identifies the first cell and the first terminal identifier that uniquely identifies the terminal in the first cell, and the first cell identifier includes at least one of an E-UTRAN cell global identifier ECGI, a physical cell identifier PCI, or a cell identifier including an identifier of an area and an identifier of the first cell in the area; or the source identifier includes a first base station identifier that uniquely identifies the first base station and the first terminal identifier that uniquely identifies the terminal in the first base station.

In the embodiments of the present invention, a low-overhead state is designed, and a terminal in the state stores a connection context of the terminal in a connected mode, and camps on a cell according to a cell reselection criterion during movement. In addition, the terminal in the low-overhead state receives a source identifier sent by a source base station, and reports the source identifier to a current serving base station of the terminal during movement when a specific condition is satisfied. Finally, the serving base station sends the source identifier to the source base station, so that both the serving base station and the source base station can learn location information of the terminal. That is, the terminal autonomously performs mobility based on cell reselection after the terminal enters the low-overhead state, and reports only location change information of the terminal, thereby simplifying a handover procedure and reducing communication resources of a network device. Further, because both the source base station and the terminal store the connection context of the terminal after the terminal enters the low-overhead state, when the terminal needs to perform uplink or downlink data communication, the connection context of the terminal can be handed over to the current serving base station of the terminal for data transmission, thereby ensuring data transmission efficiency.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, and a Universal Mobile Telecommunications System (UMTS).

It should be further understood that, in the embodiments of the present invention, a base station may be a base transceiver station (BTS) in the GSM or CDMA system, may be a NodeB in the WCDMA system, or may be an evolved NodeB (eNB, or eNodeB) in the LTE system, or a base station device in a future 5G network. This is not limited in the present invention.

It should be further understood that, in the embodiments of the present invention, UE may communicate with one or more core networks by using a radio access network (RAN), and the UE may be referred to as an access terminal, a terminal device, a subscriber unit, a subscriber station, a mobile station, a mobile console, a remote station, a remote terminal, a mobile device, a user terminal, a terminal, a radio communications device, a user agent, or a user apparatus. The UE may be a cellular phone, a cordless phone, a smartphone, a Session Initiation Protocol (SIP) phone, a wireless local loop (WLL) station, a smart band, a smart wearable device, an Moving Picture Experts Group Audio Layer III (MP3) player, an Moving Picture Experts Group Audio Layer IV (MP4) player, a personal digital assistant (PDA), a handheld device having a wireless communication function, a computing device or another processing device connected to a wireless modem, an in-vehicle device, a terminal device in the future 5G network, or the like.

Figure 1:
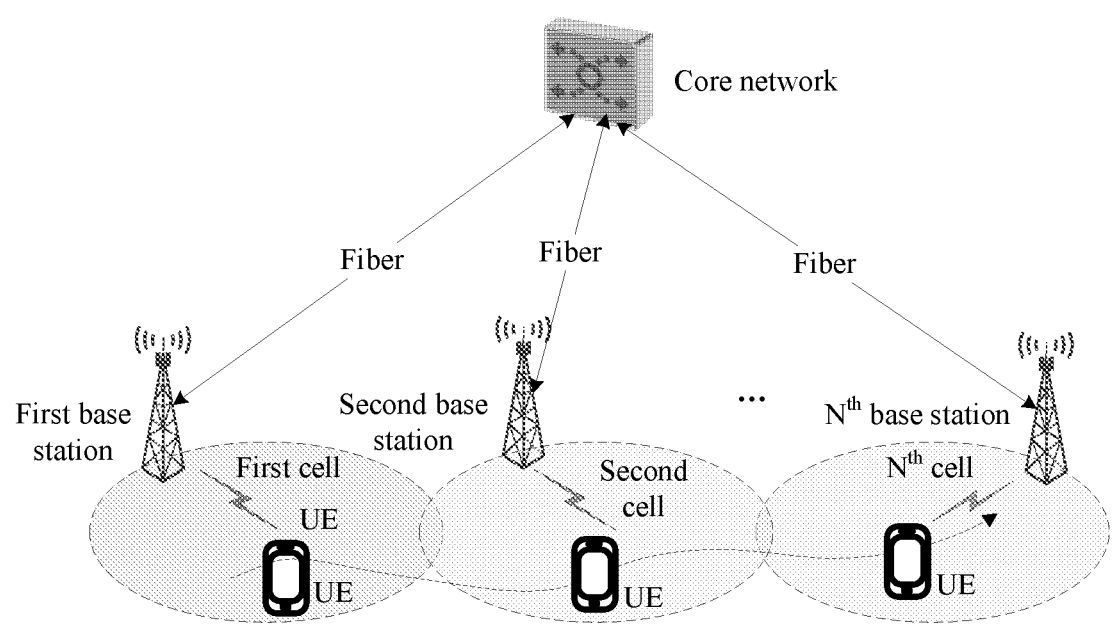
FIG. 1 is a schematic diagram of a mobility management network architecture according to the present invention.

To help understand the embodiments of the present invention, the following first describes a mobility management network architecture on which the embodiments of the present invention are based. Referring to FIG. 1, the network architecture includes a base station, a core network, and user equipment UE. During movement from a first cell to a second cell and then to an $N^{th}$ cell, the UE implements data transmission by means of wireless communication with a corresponding first base station, second base station, and $N^{th}$ base station. The base stations are connected to the core network by using fibers, to implement data or service connection, management, bearers, and the like. It may be understood that, the foregoing network architecture in FIG. 1 is merely an implementation in the embodiments of the present invention, and the network architecture in the embodiments of the present invention includes but is not limited to the foregoing network architecture.

Figure 2:
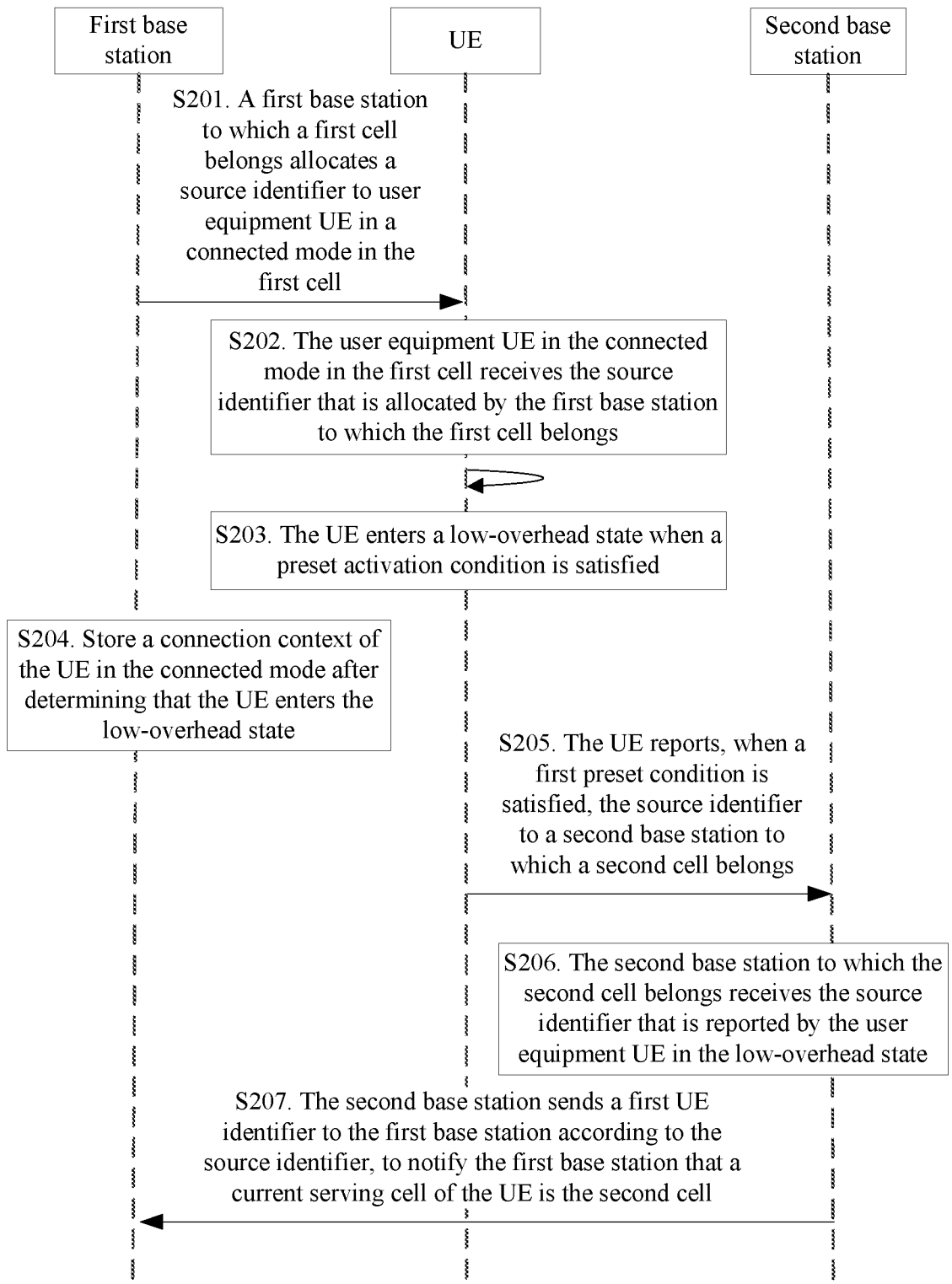
FIG. 2 is a schematic flowchart of a mobility management method according to the present invention.

Referring to FIG. 2, FIG. 2 is a schematic flowchart of a mobility management method according to an embodiment of the present invention. The following gives a detailed description with reference to FIG. 2 from the perspective of interaction between a first base station, user equipment UE, and a second base station. As shown in FIG. 2, the method may include the following step S201 to step S207.

S201. A first base station to which a first cell belongs allocates a source identifier to user equipment UE in a connected mode in the first cell, where the source identifier includes a first UE identifier that identifies the UE in the first base station.

Specifically, the first base station allocates the source identifier to the UE in the connected mode in the first cell by using a cell broadcast message or a dedicated message or in a random access channel RACH procedure.

Further, the source identifier may be allocated by using the dedicated message or a radio resource control RRC (RRC) message, for example, a radio bearer re-configuration message, a radio bearer release message, or a radio bearer re-establishment message. When the source identifier is allocated in the RACH procedure, the source identifier may be carried in a preamble response message.

Furthermore, the source identifier includes a first cell identifier that identifies the first cell and the first UE identifier that uniquely identifies the UE in the first cell, or the source identifier includes a first base station identifier that uniquely identifies the first base station and the first UE identifier that uniquely identifies the UE in the first base station. A method for uniquely identifying the UE in the first cell by using the first UE identifier is not limited to uniquely identifying the UE only by using the first UE identifier. The UE may be uniquely identified by using both the first UE identifier and other auxiliary information such as authentication information. The authentication information is generated according to a key of the UE. Specifically, for example, the first cell identifier includes at least one of an E-UTRAN cell global identifier ECGI, a physical cell identifier PCI, and a cell identifier that includes an identifier of an area and an identifier of the first cell in the area. The area is a specific cell range obtained by division by a network. For example, if an area includes 256 cells, an identifier of the area has 8 bits; if a maximum of 256 cells are supported in an area, a cell identifier in the area has 8 bits. A corresponding cell identifier includes 16 bits, the first 8 bits are the identifier of the area, and the last 8 bits are the cell identifier in the area. Likewise, the base station identifier may also include an identifier of an area and an identifier of a base station in the area. Furthermore, the source identifier may further include identifier division indication information, and the identifier division indication information is used to indicate bits in the source identifier that are divided for the base station identifier and the first UE identifier that identifies the UE in the base station. Different values of the identifier division indication information represent different division rules. For example, the source identifier occupies 50 bits, and 2 bits in the 50 bits are the identifier division indication information. When a value of the identifier division indication information is 0, it indicates that the base station identifier occupies 24 bits, and the first UE identifier occupies (50−24−2=24) bits. When a value of the identifier division indication information is 1, it indicates that the base station identifier occupies 20 bits, and the first UE identifier occupies (50−20−2=28) bits. Likewise, the source identifier may further include identifier division indication information, and the identifier division indication information is used to indicate bits in the source identifier that are divided for the first cell identifier and the first UE identifier that identifies the UE in the first cell identifier. A specific method is the same as division for the base station identifier and the UE identifier.

S202. The user equipment UE in the connected mode in the first cell receives the source identifier that is allocated by the first base station to which the first cell belongs, where the source identifier includes the first UE identifier that uniquely identifies the UE in a cell of the first base station.

Specifically, the UE receives the source identifier by using the cell broadcast message or the dedicated message of the first base station to which the first cell belongs, or in the random access channel RACH procedure.

S203. The UE enters a low-overhead state when a preset activation condition is satisfied, where in the low-overhead state, the UE stores a connection context of the UE in the connected mode, and camps on a cell according to a cell reselection criterion during movement.

Specifically, from the perspective of the UE, the preset activation condition includes at least one of the following conditions:

the UE receives, from the first base station, a control instruction used to instruct to enter the low-overhead state;

the UE leaves the first cell;

no data has been transmitted between the UE and the first base station within first preset duration;

a timing advance timer TA timer of the UE expires, or a TA timer of the UE expires and the TA timer has not run again within second preset duration; or the UE enters a discontinuous reception DRX state, and has not exited the DRX state within third preset duration.

Further, the UE exits the low-overhead state when a second preset condition is satisfied. The second preset condition includes at least one of the following conditions:

a serving cell on which the UE currently camps changes; or a serving cell on which the UE currently camps goes beyond a specified cell set range; or a serving cell on which the UE currently camps and the first cell do not belong to a same preset area or a same base station; or the UE sends the source identifier to second base station and receives an access reject indication for the source identifier from the second base station; or the UE reads a system information broadcast of second cell, and the system information broadcast does not carry an indication that access of the UE in the low-overhead state is allowed; or the UE needs to send uplink data; or the UE obtains a reference signal measurement result, and a result of comparison between the reference signal measurement result and a first predetermined threshold conforms to a preset result; or a PLMN of the UE changes.

That a serving cell on which the UE currently camps and the first cell do not belong to a same preset area or a same base station is specifically as follows: The UE determines, according to area identifiers carried in system information broadcasts of the first cell and the currently camped cell, whether the serving cell on which the UE currently camps and the first cell belong to a same preset area; or the UE determines, according to base station identifiers carried in system information broadcasts of the first cell and the currently camped cell, whether the serving cell on which the UE currently camps and the first cell belong to a same preset area.

The reference signal measurement result includes a path loss, signal strength, or signal quality. The predetermined result is "greater than", "equal to", "less than", or a combination thereof. The UE obtains the reference signal measurement result, compares the reference signal measurement result with the first predetermined threshold, and exits the low-overhead state when the result conforms to the preset result. For example, a predetermined path loss is greater than the first threshold.

That a public land mobile network (PLMN) of the UE changes includes: a home PLMN of a cell currently selected by the UE does not belong to a PLMN set that is currently set by the UE. Specifically, none of current home PLMNs belongs to the PLMN set that is currently set by the UE. The PLMN set that is currently set by the UE includes any one or a combination of the following three items: a PLMN that the UE currently registers, or a PLMN selected by the UE, or an equivalent PLMN of the UE.

Furthermore, the UE clears the connection context and enters an idle mode when the second preset condition is satisfied. Furthermore, the UE notifies a high layer of the UE that the UE has exited the low-overhead state. Alternatively, the UE notifies a high layer of the UE that the UE has exited the low-overhead state, and the high layer of the UE triggers tracking area update, or the UE triggers tracking area update. Further optionally, the UE adds an indication to a tracking area update message, and the indication is used to notify a core network that the UE is previously in the low-overhead state, so that the core network triggers connection release of the UE according to the information.

Furthermore, the UE exits the low-overhead state when the second preset condition is satisfied, and the exiting the low-overhead state includes clearing the stored connection context.

In an optional implementation, the connection context includes a configuration parameter for connection between the first base station and the UE, and may specifically include a radio bearer configuration of the UE and identification information of the UE. The radio bearer configuration includes a signaling radio bearer configuration and/or a data radio bearer configuration. The identification information of the UE may include the source identifier of the UE. The connection context may further include key information, and the key information is used during encrypted transmission or generation of UE verification information.

In an optional implementation, the UE receives radio resource control RRC configuration information sent by the first base station. The RRC configuration information includes an RRC configuration index, and the configuration index is used to indicate the RRC configuration information. After the UE enters the low-overhead state when the preset activation condition is satisfied, the UE uses the RRC configuration information in the low-overhead state.

In an optional implementation, after the UE enters the low-overhead state when the preset activation condition is satisfied, the UE releases the dedicated UE identifier of the UE in the first cell.

In an optional implementation, after the UE enters the low-overhead state when the preset activation condition is satisfied, the UE performs paging listening by using the source identifier.

It should be emphasized that, the low-overhead state in the present invention is a UE state defined in the present invention, and a characteristic of the low-overhead state includes connection context storage, and mobility based on cell reselection. The low-overhead state is characterized by low signaling overheads and low power overheads, and therefore is named "low-overhead state" in the present invention. The low-overhead state may be a sub-state of the connected mode or an enhanced state of the idle mode. This is not limited in the present invention. For example, the low-overhead state may be a state in which the UE is in the idle mode and the connection context is stored, and the UE in the low-overhead state enters a normal idle mode after clearing the context. Alternatively, the low-overhead state may be a state in which the UE is in the connected mode and is allowed to perform mobility based on cell reselection, and the UE in the low-overhead state enters a normal connected mode after stopping performing mobility based on cell reselection.

S204. The first base station stores the connection context of the UE in the connected mode after determining that the UE enters the low-overhead state.

Specifically, from the perspective of the first base station, the preset activation condition includes at least one of the following conditions:

the first base station sends, to the UE, a control instruction used to instruct the UE to enter the low-overhead state;

no data has been transmitted between the first base station and the UE within first preset duration;

the first base station determines that a timing advance timer TA timer of the UE expires, or the first base station determines that a TA timer of the UE expires and the TA timer has not run again within second preset duration; or the first base station determines that the UE enters a discontinuous reception DRX state, and has not exited the DRX state within third preset duration. The control instruction that is sent by the first base station to the UE and that is used to instruct the UE to enter the low-overhead state may be RRC signaling, or may be MAC layer signaling or physical layer signaling. The control instruction and the source identifier may be sent to the UE in a same message, or may be sent to the UE in different messages. This is not specifically limited in the present invention.

In an optional implementation, the first base station further sends the radio resource control RRC configuration information to the UE for use by the UE in the low-overhead state. Further, the RRC configuration information includes the RRC configuration index, and the configuration index is used to indicate the RRC configuration information. Optionally, the RRC configuration includes the radio bearer configuration of the UE in the low-overhead state, and the radio bearer configuration includes the signaling radio bearer configuration and/or the data radio bearer configuration. Further optionally, the RRC configuration may further include the key information, and the key information is used during encrypted transmission.

S205. The UE reports, when a first preset condition is satisfied, the source identifier to a second base station to which a second cell belongs, where the second cell is a serving cell on which the UE currently camps.

Specifically, the first preset condition includes:
the serving cell on which the UE currently camps changes; or
the second cell on which the UE currently camps goes beyond a specified cell set range; or
the second cell on which the UE currently camps and the first cell do not belong to a same preset area or a same base station; or
the UE needs to send uplink data.

In an optional implementation, before the UE reports the source identifier to the second base station when the first preset condition is satisfied, the UE receives and reads a system information broadcast of the second cell. If the system information broadcast carries an indication that access of the UE in the low-overhead state is allowed, the UE determines, according to the access indication, to send the source identifier to the second base station.

In an optional implementation, before the UE reports the source identifier to the second base station when the first preset condition is satisfied, the UE determines, according to a reference signal measurement result, to report the source identifier. The reference signal measurement result includes a path loss, signal quality, or signal strength. The UE compares the reference signal measurement result with a first predetermined threshold, and determines, according to a result of the comparison, whether to report the identifier. The first predetermined threshold may be a preset constant value, or a threshold configured by the base station for the UE. For example, if the reference signal measurement result is the path loss, the UE determines that the source identifier can be reported only when the path loss is less than the first predetermined threshold. Otherwise, the UE exits the low-overhead state, and clears the stored context.

In an optional implementation, before the UE reports the source identifier to the second base station when the first preset condition is satisfied, the UE sends a random access preamble within a preset range to the second base station, where the random access preamble within the preset range is used to indicate that the source identifier needs to be sent to the second base station or a message of a length that is greater than a preset length threshold needs to be sent to the second base station; receives a preset-size transmission resource that is allocated by the second base station and that is used to transmit the source identifier; and sends the source identifier to the second base station by using the transmission resource. Further, the random access preamble within the preset range is a predefined preamble or a received preamble configured by the second base station.

In an optional implementation, the reporting, by the UE, the source identifier to a second base station may be specifically: reporting, by the UE, the source identifier including the RRC configuration index to the second base station, so that the second base station determines, according to the RRC configuration index, the RRC configuration information used by the UE.

In an optional implementation, the reporting, by the UE, the source identifier to a second base station may be specifically: sending, by the UE, a random access preamble to the second base station; receiving a dedicated UE identifier sent by the second base station and a transmission resource that is sent by the second base station, allocated according to the random access preamble, and used to transmit the source identifier, where the dedicated UE identifier is an identifier that uniquely identifies the UE in the second cell; sending the source identifier to the second base station by using the transmission resource; receiving acknowledgment information that is sent by the second base station and that includes the source identifier; and determining, according to the acknowledgment information, whether to apply the dedicated UE identifier. Further, the determining, by the UE according to the acknowledgment information, whether to apply the dedicated UE identifier is specifically:

skipping applying, by the UE, the dedicated UE identifier according to the acknowledgment information; or
applying, by the UE, the dedicated UE identifier according to the acknowledgment information, and exiting the low-overhead state; or
applying, by the UE, the dedicated UE identifier according to the acknowledgment information, and remaining in the low-overhead state; or
applying, by the UE, the dedicated UE identifier and exiting the low-overhead state according to an instruction that is carried in the acknowledgment information and that is used to instruct the UE to exit the low-overhead state. Furthermore, after applying the dedicated UE identifier, the UE updates a key in the connection context according to a cell identifier of the currently camped serving cell. Furthermore, the source identifier reported by the UE to the second base station further includes verification information, and the verification information is identity authentication information generated by the UE according to the source identifier and an updated key.

In an optional implementation, the source identifier reported by the UE further includes indication information, and the indication information is used to notify the second base station that the UE is in the low-overhead state.

In an optional implementation, the source identifier includes a long source identifier and a short source identifier, and the reporting, by the UE, the source identifier to a second base station may be specifically as follows: The UE determines, according to indication information of the second base station or a reference signal measurement result, to report the long source identifier or the short source identifier. The long source identifier and the short source identifier may be two independent source identifiers, or the short source identifier is partial information of the long source identifier. For example, the long source identifier has a length of N bits, the short source identifier may be M bits in the N bits, and M is less than N. The indication information of the second base station may be indication information configured by using a system broadcast or may be authorization information sent to the UE by using an authorization command.

Specifically, the indication information configured by using the system broadcast may be an indication used to instruct the UE to use the long source identifier or the short source identifier, and the UE may determine, according to the indication, a source identifier type used to report the source identifier. Alternatively, the indication information is the authorization information sent to the UE by using the authorization command, and the UE determines, according to the authorization information, a size of a message that can be transmitted, and chooses, according to the size of the message that can be transmitted, to use the long source identifier or the short source identifier. For example, if the authorization information has 56 bits, and a length of 25 bits can be used to fill in the source identifier, the short source identifier is selected. Alternatively, if the authorization information has 88 bits, and a length of 40 bits can be used to fill in the source identifier, the long source identifier is selected. The determining, by the UE according to a reference signal measurement result, to report the long source identifier or the short source identifier includes the following: The reference signal measurement result includes a path loss, signal quality, or signal strength. The UE compares the reference signal measurement result with a first predetermined threshold, and determines, according to a result of the comparison, to report the long source identifier or the short source identifier. The first predetermined threshold may be a preset constant value, or a threshold configured by the base station for the UE.

In an optional implementation, the source identifier includes a long source identifier and a short source identifier, and the reporting, by the UE, the source identifier to a second base station may be specifically as follows: The UE determines to first report the short source identifier and then report, in a subsequent message according to an indication of the second base station, the long source identifier or content other than the short source identifier in the long source identifier. After receiving the short source identifier, the second base station determines the first base station according to the short source identifier and sends a transfer request of the connection context to the first base station. If the context cannot be obtained, the second base station further instructs the UE to report the long source identifier or the content other than the short source identifier in the long source identifier. In this way, the long source identifier is prevented from being first reported. The short source identifier is partial information of the long source identifier. For example, the long source identifier has a length of N bits, and the short source identifier may be M bits in the N bits. For example, the short source identifier may be the least significant N bits of the long source identifier or the most significant N bits of the long source identifier. M is less than N.

It should be emphasized that, because whether a cell reselection procedure is started after the UE enters the low-overhead state depends on whether the UE moves, a serving cell of the UE when the first preset condition is satisfied may still be the first cell, or may be a cell other than the first cell. Therefore, the second cell and the first cell may be a same cell or may be different cells.

S206. The second base station to which the second cell belongs receives the source identifier that is reported by the user equipment UE in the low-overhead state.

Specifically, the first cell is a serving cell when the UE enters the low-overhead state, the second cell is a current serving cell of the UE, and the source identifier includes the first UE identifier that identifies the UE in the first base station to which the first cell belongs.

In an optional implementation, before the second base station receives the source identifier that is reported by the user equipment UE in the low-overhead state, the second base station sends the system information broadcast. The system information broadcast carries the indication that access of the UE in the low-overhead state is allowed, so that the UE determines, according to the access indication, whether to send the source identifier to the second base station. Specifically, the second base station controls, by using the system information broadcast, whether access of the UE in the low-overhead state is allowed. Therefore, the UE determines, by determining the indication carried in the broadcast, whether the source identifier can be reported.

In an optional implementation, before receiving the source identifier that is reported by the user equipment UE in the low-overhead state, the second base station receives the random access preamble sent by the UE; and allocates the preset-size transmission resource to the UE when the random access preamble falls within the preset range, so that the UE sends the source identifier by using the transmission resource. Further, the random access preamble within the preset range is a predefined preamble or a received preamble configured by the second base station.

In an optional implementation, the receiving, by the second base station, the source identifier that is reported by the user equipment UE in the low-overhead state is specifically: receiving, by the second base station to which the second cell belongs, the random access preamble that is sent by the user equipment UE in the low-overhead state; allocating, to the UE according to the random access preamble, the dedicated UE identifier and the transmission resource that is used to transmit the source identifier, where the dedicated UE identifier is an identifier that uniquely identifies the UE in the second cell; receiving the source identifier by using the transmission resource; and sending the acknowledgment information including the source identifier to the UE. Further, the sending, by the second base station, the acknowledgment information including the source identifier to the UE is specifically: sending, by the second base station to the UE, an acknowledgment message that includes the source identifier and that carries an instruction used to instruct the UE to exit the low-overhead state, so that the UE applies the dedicated UE identifier and exits the low-overhead state according to the instruction.

In an optional implementation, the source identifier reported by the UE and received by the second base station further includes the radio resource control RRC configuration index, and after receiving the source identifier that is reported by the UE in the low-overhead state, the second base station determines, according to the RRC configuration index, the RRC configuration information used by the UE.

S207. The second base station sends the first UE identifier to the first base station according to the source identifier, to notify the first base station that the current serving cell of the UE is the second cell.

Specifically, the second base station sends the source identifier to the first base station according to the source identifier by using an interface between the second base station and the first base station; or sends the source identifier to the first base station according to the source identifier by using the core network.

In an optional implementation, the second base station sends a notification message to the first base station according to the source identifier. The notification message carries the source identifier of the UE and a second cell identifier of the second cell in which the UE is currently located, and the second cell is the serving cell on which the UE currently camps. The first base station receives the notification message sent by the second base station, and determines, according to the source identifier and the second cell identifier, that the serving cell on which the UE currently camps is the second cell. Further, the notification message carries verification information of the UE, and the verification information is identity authentication information generated by the UE according to the source identifier and a key that is included in the connection context. The first base station determines, according to the source identifier and the verification information, whether the UE is valid UE.

In an optional implementation, after sending the first UE identifier to the first base station according to the source identifier, the second base station receives the connection context and the source identifier of the UE that are sent by the first base station; and determines configuration information of the UE according to the received connection context and source identifier, and triggers uplink access of the UE according to the source identifier.

In this embodiment of the present invention, the interaction procedure implemented in the present invention is not limited to execution of all steps at a time, that is, processing steps of the UE, the first base station, and the second base station may be independently performed in the UE, the first base station, and the second base station. Separate implementation of any device including the UE, the first base station, or the second base station falls within the protection scope of this embodiment of the present invention.

In this embodiment of the present invention, a low-overhead state is designed, and UE in the state stores a connection context of the UE in a connected mode, and camps on a cell according to a cell reselection criterion during movement. In addition, the UE in the low-overhead state receives a source identifier sent by a source base station, and reports the source identifier to a current serving base station of the UE during movement when a specific condition is satisfied. Finally, the serving base station sends the source identifier to the source base station, so that both the serving base station and the source base station can learn location information of the UE. That is, the UE autonomously performs mobility based on cell reselection after the UE enters the low-overhead state, and reports only location change information of the UE, thereby simplifying a handover procedure and reducing communication resources of a network device.

Figure 3A:
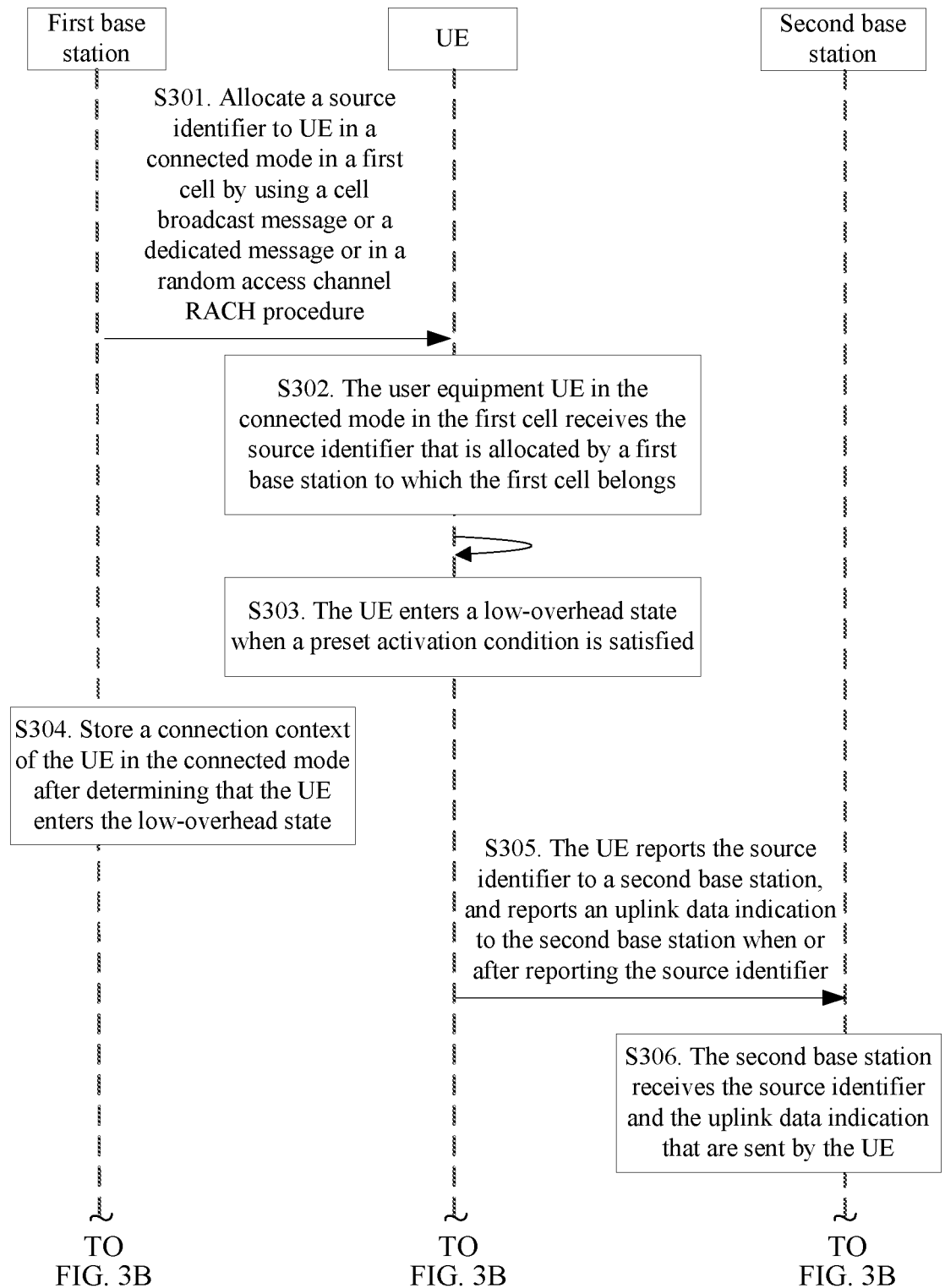
FIG. 3A and FIG. 3B are a schematic flowchart of another mobility management method according to the present invention.
Figure 3B:
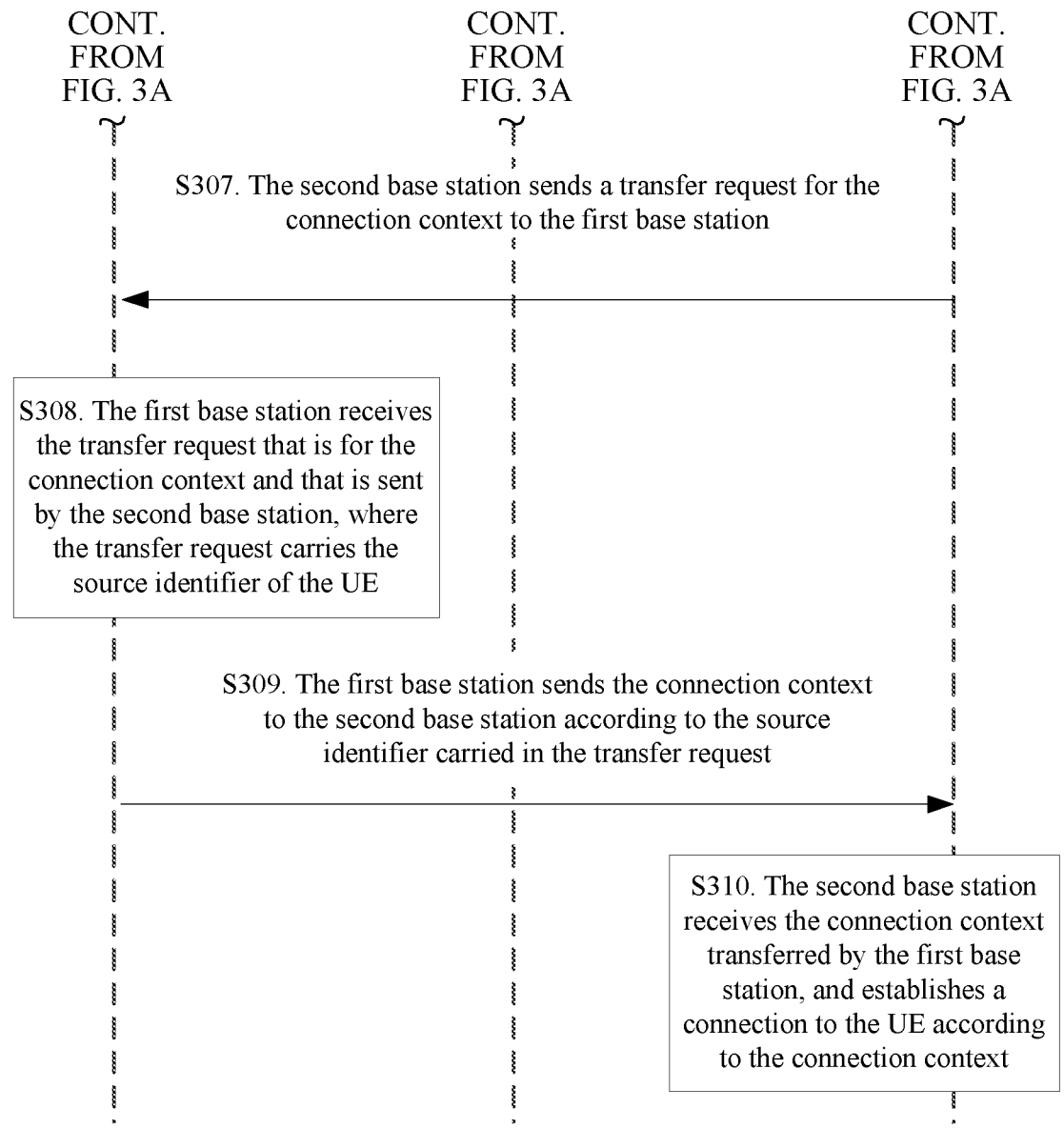

Referring to FIG. 3A and FIG. 3B, FIG. 3A and FIG. 3B are a schematic flowchart of another mobility management method according to an embodiment of the present invention. The following gives a description with reference to FIG. 3A and FIG. 3B from the perspective of interaction between a first base station, UE, and a second base station. As shown in FIG. 3A and FIG. 3B, the method may include the following step S301 to step S310.

Step S301: A first base station to which a first cell belongs allocates a source identifier to UE in a connected mode in the first cell by using a cell broadcast message or a dedicated message or in a random access channel RACH procedure.

Step S302: The user equipment UE in the connected mode in the first cell receives the source identifier that is allocated by the first base station to which the first cell belongs, where the source identifier includes a first UE identifier that uniquely identifies the UE in a cell of the first base station.

Step S303: The UE enters a low-overhead state when a preset activation condition is satisfied, where in the low-overhead state, the UE stores a connection context of the UE in the connected mode, and camps on a cell according to a cell reselection criterion during movement.

Step S304: The first base station stores the connection context of the UE in the connected mode after determining that the UE enters the low-overhead state. The UE enters the low-overhead state when the preset activation condition is satisfied, and in the low-overhead state, the UE stores the connection context of the UE, and camps on a cell according to the cell reselection criterion during movement.

Specifically, for step S301 to step S304, correspondingly refer to step S201 to step S204 in the embodiment in FIG. 2. Details are not described herein again.

Step S305: This step includes processing in step S205 when the first preset condition is that the UE needs to send uplink data, and the reporting, by the UE, the source identifier to a second base station to which a second cell belongs further includes: reporting, by the UE when or after reporting the source identifier, an uplink data indication to the second base station to which the second cell belongs.

Specifically, the source identifier and the uplink data indication may be carried in a same report message or different report messages, and the report message may be an RRC message, a MAC control information element, or a physical layer control message. The uplink data indication may be a bit used to indicate that data of the UE arrives, or may be a data amount indication.

Step S306: The second base station receives the source identifier and the uplink data indication that are sent by the UE.

Step S307: The second base station sends a transfer request for the connection context to the first base station, where the connection context is a connection context that is of the UE in the connected mode and that is stored by the first base station when the UE enters the low-overhead state, and the transfer request of the connection context carries the source identifier of the UE.

Step S308: The first base station receives the transfer request that is for the connection context and that is sent by the second base station to which the second cell belongs, where the transfer request carries the source identifier of the UE, and the second cell is a cell on which the UE currently camps.

Step S309: The first base station sends the connection context to the second base station according to the source identifier carried in the transfer request.

In an optional implementation, after the first base station sends the connection context to the second base station, the first base station further sends a handover indication for a core network data path to the second base station, so that the second base station determines whether to hand over the core network data path to the second base station.

In an optional implementation, the first base station sends a paging parameter to the second base station when, before, or after the first base station sends the connection context to the second base station. The paging parameter includes a paging index of the UE or a DRX cycle of the UE. The second base station may trigger paging on the UE according to the paging parameter.

Step S310: The second base station receives the connection context transferred by the first base station, and establishes a connection to the UE according to the connection context.

In an optional implementation, the second base station determines configuration information of the UE according to the connection context together with the source identifier, and triggers uplink access of the UE according to the source identifier. Further, the triggering uplink access of the UE according to the source identifier is specifically:

paging the UE by using the source identifier; or
determining a dedicated UE identifier of the UE according to the source identifier, and sending an uplink access command to the UE by using the dedicated UE identifier; or
determining a dedicated UE identifier of the UE according to the source identifier, and paging the UE by using the dedicated UE identifier.

In an optional implementation, after receiving the connection context transferred by the first base station, the second base station further sends a re-allocated source identifier to the UE, where the re-allocated source identifier includes a second UE identifier that identifies the UE in the second base station; and sends an instruction to the UE to instruct the UE to exit the low-overhead state.

In this embodiment of the present invention, the interaction procedure implemented in the present invention is not limited to execution of all steps at a time, that is, processing steps of the UE, the first base station, and the second base station may be independently performed in the UE, the first base station, and the second base station. Separate implementation of any device including the UE, the first base station, or the second base station falls within the protection scope of this embodiment of the present invention.

In this embodiment of the present invention, a low-overhead state is designed, and UE in the state stores a connection context of the UE in a connected mode, and camps on a cell according to a cell reselection criterion during movement. In addition, the UE in the low-overhead state receives a source identifier sent by a source base station, and reports the source identifier to a current serving base station of the UE during movement when a specific condition is satisfied. Finally, the serving base station sends the source identifier to the source base station, so that both the serving base station and the source base station can learn location information of the UE. That is, the UE autonomously performs mobility based on cell reselection after the UE enters the low-overhead state, and reports only location change information of the UE, thereby simplifying a handover procedure and reducing communication resources of a network device. Further, because both the source base station and the UE store the connection context of the UE after the UE enters the low-overhead state, when the UE needs to perform uplink or downlink data communication, the connection context of the UE can be handed over to the current serving base station of the UE for data transmission, thereby ensuring data transmission efficiency.

Figure 4A:
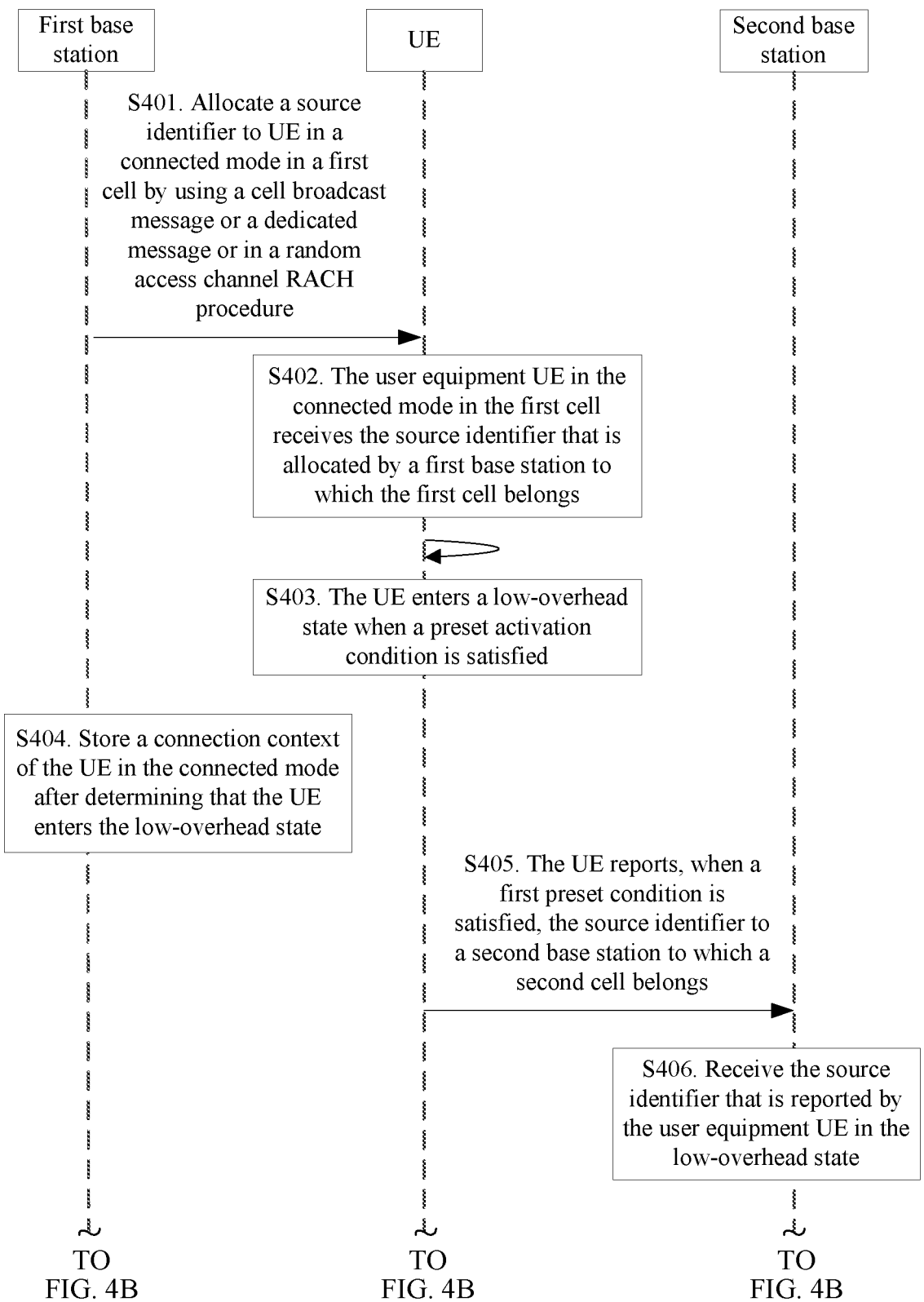
FIG. 4A and FIG. 4B are a schematic flowchart of still another mobility management method according to the present invention.
Figure 4B:
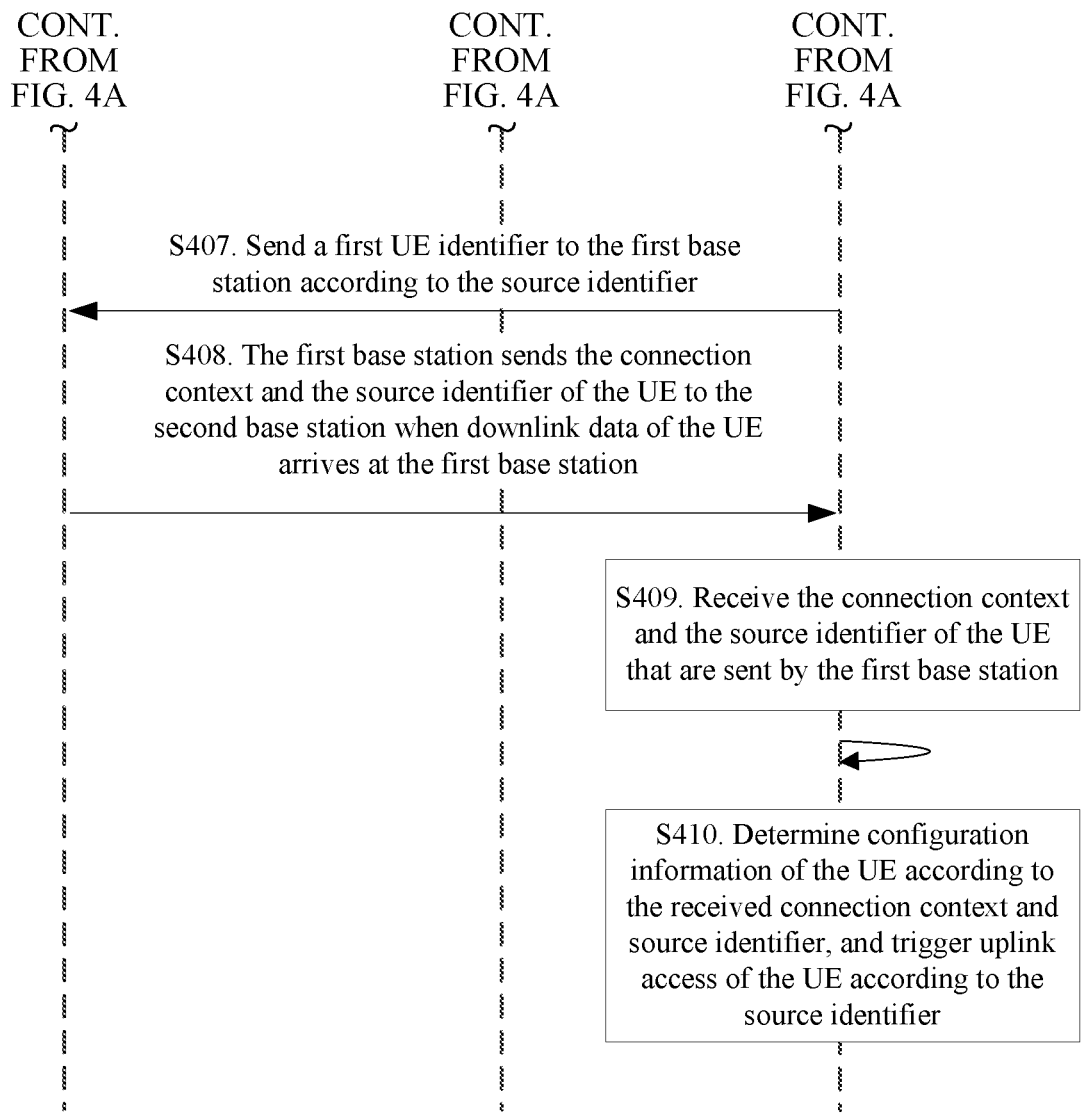

Referring to FIG. 4A and FIG. 4B, FIG. 4A and FIG. 4B are a schematic flowchart of still another mobility management method according to an embodiment of the present invention. The following gives a description with reference to FIG. 4A and FIG. 4B from the perspective of interaction between a first base station, UE, and a second base station. As shown in FIG. 4A and FIG. 4B, the method may include the following step S401 to step S410.

Step S401: A first base station to which a first cell belongs allocates a source identifier to UE in a connected mode in the first cell by using a cell broadcast message or a dedicated message or in a random access channel RACH procedure.

Step S402: The user equipment UE in the connected mode in the first cell receives the source identifier that is allocated by the first base station to which the first cell belongs, where the source identifier includes a first UE identifier that uniquely identifies the UE in a cell of the first base station.

Step S403: The UE enters a low-overhead state when a preset activation condition is satisfied, where in the low-overhead state, the UE stores a connection context of the UE in the connected mode, and camps on a cell according to a cell reselection criterion during movement.

Step S404: The first base station stores the connection context of the UE in the connected mode after determining that the UE enters the low-overhead state. In the low-overhead state, the UE stores the connection context, and camps on a cell according to the cell reselection criterion during movement.

Step S405: The UE reports, when a first preset condition is satisfied, the source identifier to a second base station to which a second cell belongs, where the second cell is a serving cell on which the UE currently camps.

Step S406: The second base station to which the second cell belongs receives the source identifier that is reported by the user equipment UE in the low-overhead state. In the low-overhead state, the UE stores the connection context of the UE in the connected mode, and camps on a cell according to the cell reselection criterion during movement, a first cell is a serving cell when the UE enters the low-overhead state, the second cell is a current serving cell of the UE, and the source identifier includes the first UE identifier that identifies the UE in the first base station to which the first cell belongs.

Step S407: The second base station sends the first UE identifier to the first base station according to the source identifier.

Specifically, for step S401 to step S407, correspondingly refer to step S201 to step S207 in the embodiment in FIG. 2. Details are not described herein again.

Step S408: The first base station sends the connection context and the source identifier of the UE to the second base station when downlink data of the UE arrives at the first base station, where the second base station is a base station to which the second cell belongs.

Specifically, when the downlink data of the UE arrives at the first base station, the first base station sends the connection context and the source identifier of the UE to the second base station, so that the second base station performs data communication with the UE according to the connection context. In addition, the first base station further forwards the downlink data of the UE to the second base station, so that the second base station, as a current serving base station of the UE, can send the downlink data to the UE.

Step S409: Receive the connection context and the source identifier of the UE that are sent by the first base station.

Step S410: Determine configuration information of the UE according to the received connection context and source identifier, and trigger uplink access of the UE according to the source identifier.

Specifically, for step S409 and step S410, correspondingly refer to step S207 in the embodiment in FIG. 2. Details are not described herein again.

In this embodiment of the present invention, the interaction procedure implemented in the present invention is not limited to execution of all steps at a time, that is, processing steps of the UE, the first base station, and the second base station may be independently performed in the UE, the first base station, and the second base station. Separate implementation of any device including the UE, the first base station, or the second base station falls within the protection scope of this embodiment of the present invention.

In this embodiment of the present invention, a low-overhead state is designed, and UE in the state stores a connection context of the UE in a connected mode, and camps on a cell according to a cell reselection criterion during movement. In addition, the UE in the low-overhead state receives a source identifier sent by a source base station, and reports the source identifier to a current serving base station of the UE during movement when a specific condition is satisfied. Finally, the serving base station sends the source identifier to the source base station, so that both the serving base station and the source base station can learn location information of the UE. That is, the UE autonomously performs mobility based on cell reselection after the UE enters the low-overhead state, and reports only location change information of the UE, thereby simplifying a handover procedure and reducing communication resources of a network device. Further, because both the source base station and the UE store the connection context of the UE after the UE enters the low-overhead state, when the UE needs to perform uplink or downlink data communication, the connection context of the UE can be handed over to the current serving base station of the UE for data transmission, thereby ensuring data transmission efficiency.

Figure 8A:
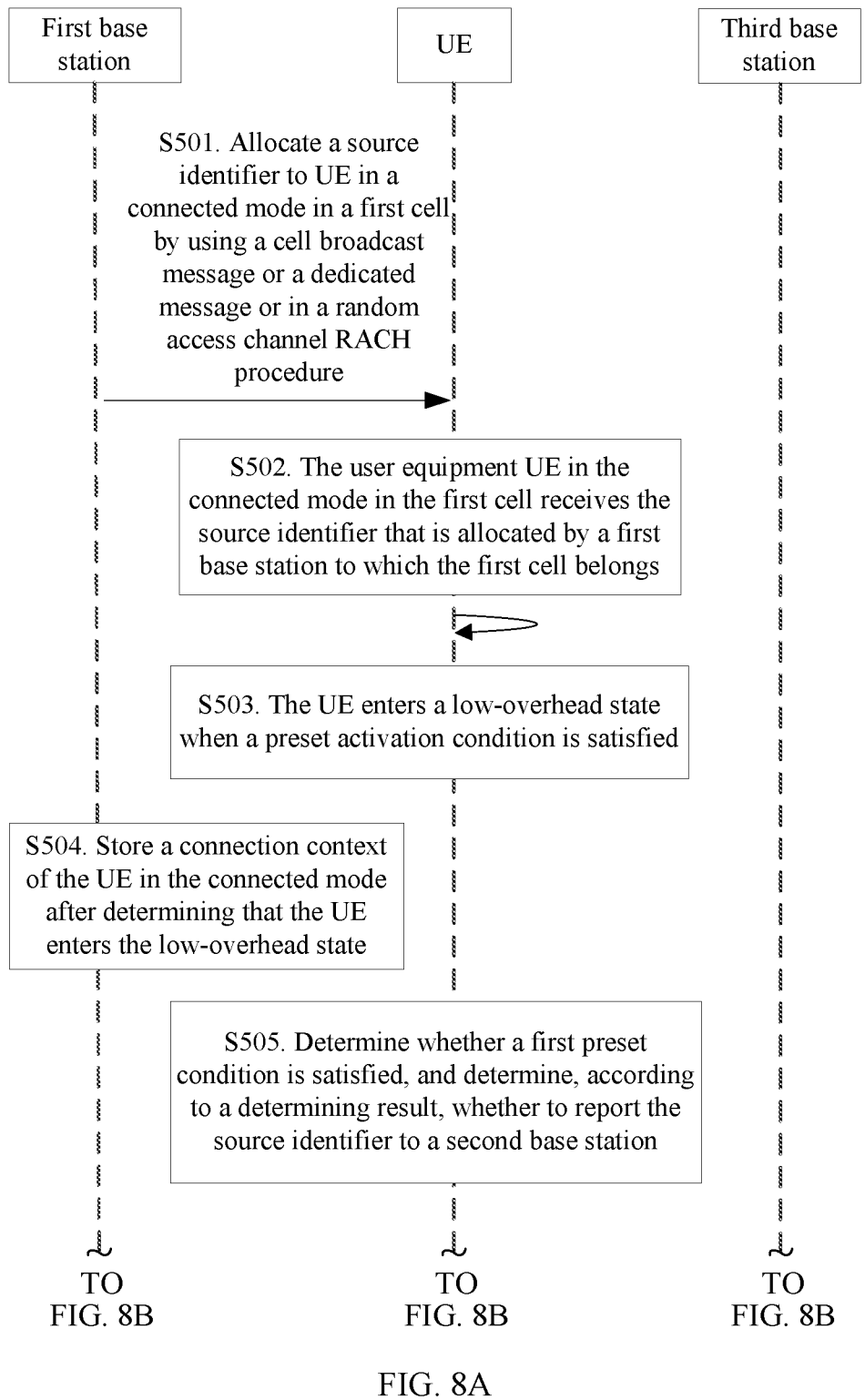
FIG. 8A and FIG. 8B are a schematic flowchart of yet another mobility management method according to the present invention.
Figure 8B:
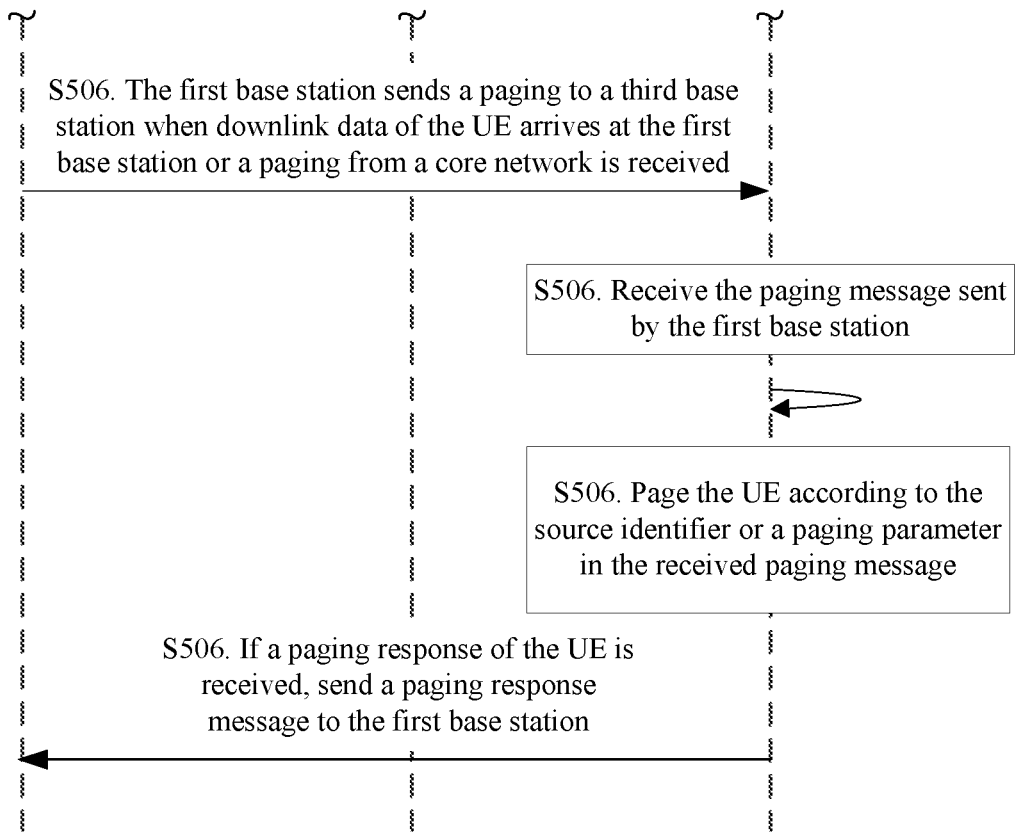

Referring to FIG. 8A and FIG. 8B, FIG. 8A and FIG. 8B are a schematic flowchart of yet another mobility management method according to an embodiment of the present invention. The following gives a description with reference to FIG. 8A and FIG. 8B from the perspective of interaction between a first base station, UE, and a second base station. As shown in FIG. 8A and FIG. 8B, the method may include the following step S501 to step S506.

Step S501: A first base station to which a first cell belongs allocates a source identifier to UE in a connected mode in the first cell by using a cell broadcast message or a dedicated message or in a random access channel RACH procedure.

Step S502: The user equipment UE in the connected mode in the first cell receives the source identifier that is allocated by the first base station to which the first cell belongs, where the source identifier includes a first UE identifier that uniquely identifies the UE in a cell of the first base station.

Step S503: The UE enters a low-overhead state when a preset activation condition is satisfied, where in the low-overhead state, the UE stores a connection context of the UE in the connected mode, and camps on a cell according to a cell reselection criterion during movement.

Step S504: The first base station stores the connection context of the UE in the connected mode after determining that the UE enters the low-overhead state. In the low-overhead state, the UE stores the connection context, and camps on a cell according to the cell reselection criterion during movement.

Step S505: The UE reports, when a first preset condition is satisfied, the source identifier to a second base station to which a second cell belongs, where the second cell is a serving cell on which the UE currently camps.

Specifically, for step S501 to step S505, correspondingly refer to step S201 to step S205 in the embodiment in FIG. 2. Details are not described herein again.

Step S506: The first base station sends a second paging message to a third base station when downlink data of the UE arrives at the first base station or a first paging message from a core network device arrives at the first base station, where the third base station and the first base station are base stations belonging to a same paging area range.

Optionally, the UE in the low-overhead state may move within a specific area range according to a configuration without notifying the base station. Consequently, the first base station cannot learn an accurate location of the UE, and can page the UE only within the specific range. Specifically, in step S505, when the UE satisfies the first preset condition, the UE reports the source identifier to the second base station to which the second cell belongs. The first preset condition includes: the second cell on which the UE currently camps goes beyond a specified cell set range; or the second cell on which the UE currently camps and the first cell do not belong to a same preset area or a same base station. Therefore, when moving within the cell set or the same preset area, the UE may not send a UE identifier to the second base station. Consequently, the first base station cannot learn a specific cell, in which the UE is located, in the cell set or the preset area. The cell set or the preset area is defined as a paging area. The cell set is configured by the base station for the UE when the UE enters the low-overhead state, and the preset area is an area in which the serving cell of the UE is located when the UE enters the low-overhead state. Therefore, the first base station needs to send the second paging message to the third base station. The third base station pages the UE according to the second paging message. If the third base station receives a paging response message of the UE, the third base station returns a second paging response message to the first base station, so that the first base station can learn that the UE is currently located in the third base station, and can further trigger sending of the context of the UE to the third base station. In addition, the first base station also pages the UE, to determine whether the UE is located in the first base station.

Specifically, optionally, the base station triggers paging according to arrival of the downlink data, and before the triggering, the base station needs to obtain information about a paging parameter of the UE from the core network. The paging parameter includes a paging index of the UE or a DRX cycle of the UE. The paging parameter is used to calculate a paging offset of the UE, and the DRX cycle is a DRX cycle configured by a high layer of the UE. A specific message from which the base station obtains the information about the paging parameter of the UE from the core network may be an initial context setup message, or a context modification message, or an E-RAB setup message, or an E-RAB modification message.

Specifically, optionally, the first base station triggers paging according to a paging from the core network device, and the first base station obtains information about a paging parameter of the UE from the paging message. The paging parameter includes a paging index of the UE or a DRX cycle of the UE.

Specifically, optionally, the second paging message sent by the first base station to the third base station includes a paging parameter, and the paging parameter includes a paging index of the UE or a DRX cycle of the UE.

Specifically, optionally, the second paging message sent by the first base station to the third base station includes a paging parameter, and the paging parameter includes the source identifier of the UE.

In this embodiment of the present invention, the interaction procedure implemented in the present invention is not limited to execution of all steps at a time, that is, processing steps of the UE, the first base station, and the third base station may be independently performed in the UE, the first base station, and the second base station. Separate implementation of any device including the UE, the first base station, or the third base station falls within the protection scope of this embodiment of the present invention.

In this embodiment of the present invention, a low-overhead state is designed, and UE in the state stores a connection context of the UE in a connected mode, and camps on a cell according to a cell reselection criterion during movement. That is, the UE autonomously performs mobility based on cell reselection after the UE enters the low-overhead state, and reports only location area change information of the UE, thereby simplifying a handover procedure and reducing communication resources of a network device. Further, because both a source base station and the UE store the connection context of the UE after the UE enters the low-overhead state, when the UE needs to perform uplink or downlink data communication, the connection context of the UE can be handed over to a current serving base station of the UE for data transmission, thereby ensuring data transmission efficiency.

Figure 5:
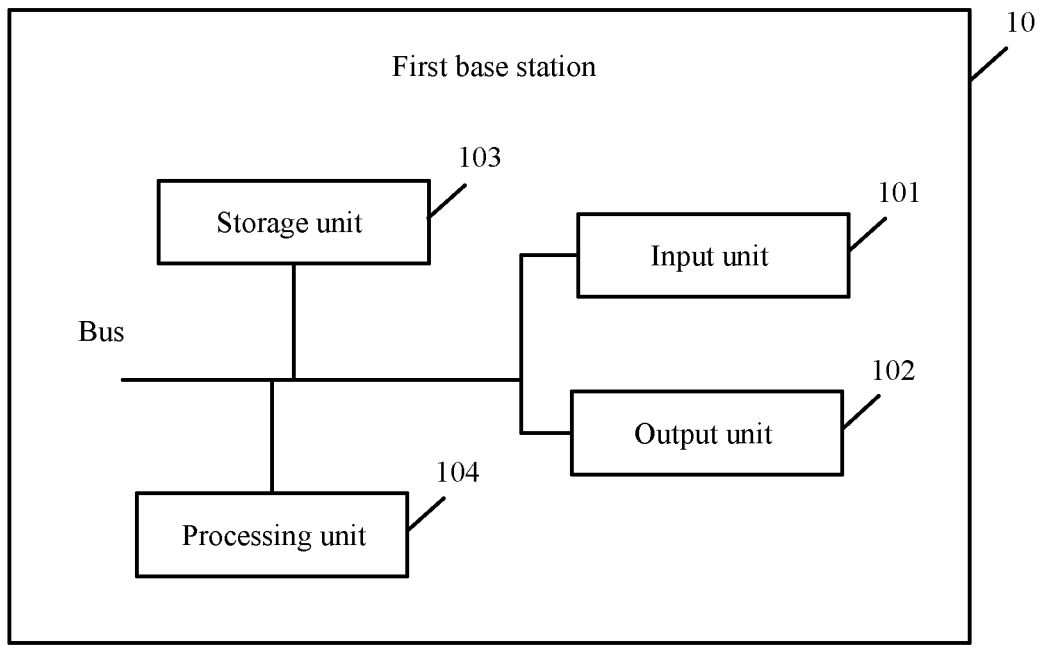
FIG. 5 is a schematic structural diagram of a first base station according to the present invention.
Figure 6:
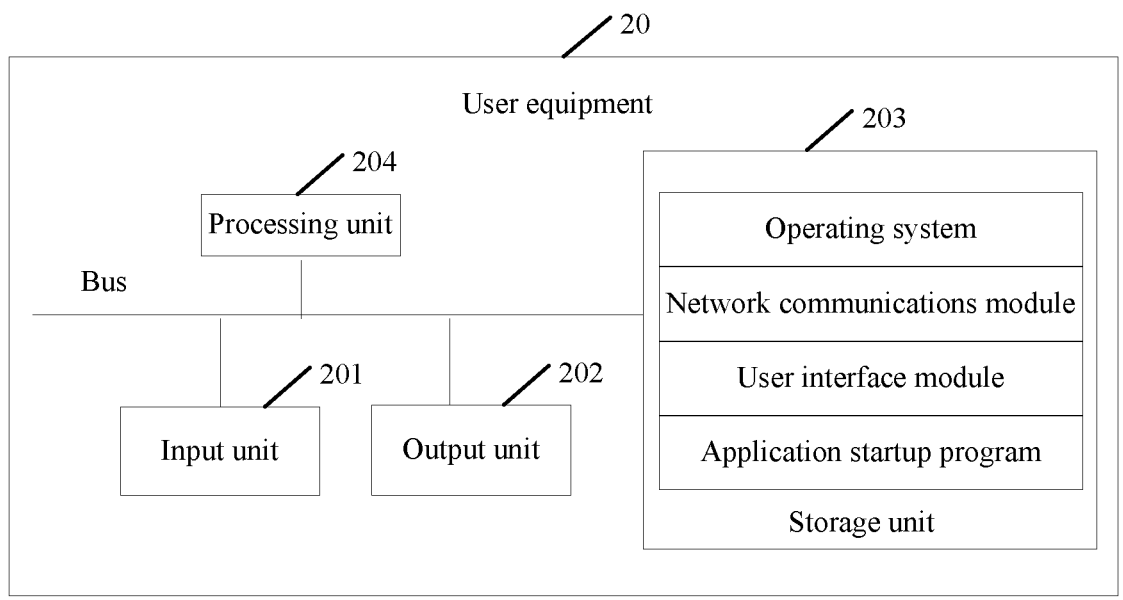
FIG. 6 is a schematic structural diagram of user equipment according to the present invention.
Figure 7:
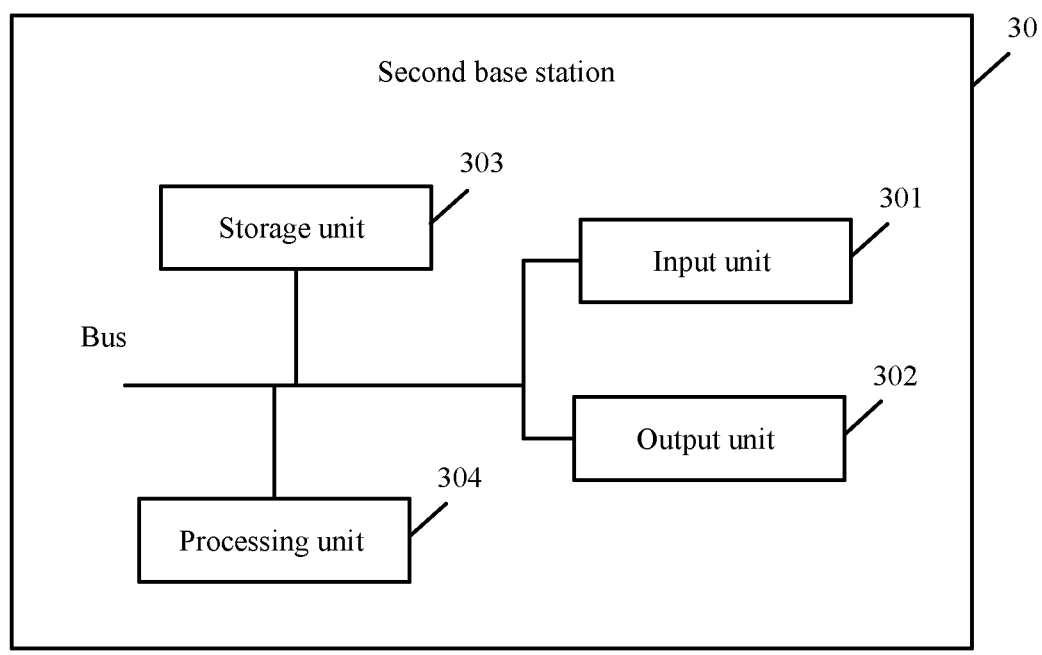
FIG. 7 is a schematic structural diagram of a second base station according to the present invention.

To better implement the method embodiments in the embodiments of the present invention, the present invention further provides related base stations and user equipment configured to cooperatively implement the method embodiments. The following gives a detailed description with reference to schematic diagrams: FIG. 5, FIG. 6, and FIG. 7 of the related base stations and user equipment provided in the present invention:

Referring to FIG. 5, FIG. 5 shows a base station 10 according to an embodiment of the present invention. The base station 10 is a first base station, and the base station 10 includes an output unit 102, a storage unit 103, and a processing unit 104. In some embodiments of the present invention, an input unit 101, the storage unit 103, and the processing unit 104 may be connected by using a bus or in another manner. FIG. 5 shows bus connection as an example. The processing unit 104 invokes program code in the storage unit 103, to perform the following operations:

allocating a source identifier to user equipment UE in a connected mode in a first cell by using the output unit 102, where the source identifier includes a first UE identifier that identifies the UE in the first base station; and
  storing a connection context of the UE in the connected mode after determining that the UE enters a low-overhead state, where the UE enters the low-overhead state when a preset activation condition is satisfied, and in the low-overhead state, the UE stores the connection context, and camps on a cell according to a cell reselection criterion during movement.

In an optional solution, the source identifier includes a first cell identifier that identifies the first cell and the first UE identifier that uniquely identifies the UE in the first cell, and the first cell identifier includes at least one of an E-UTRAN cell global identifier ECGI, a physical cell identifier PCI, or a cell identifier that includes an identifier of an area and an identifier of the first cell in the area; or
  the source identifier includes a first base station identifier that uniquely identifies the first base station and the first UE identifier that uniquely identifies the UE in the first base station.

In another optional solution, that the processing unit 104 is configured to allocate a source identifier to user equipment UE in a connected mode in the first cell by using the output unit 102 is specifically:
  allocating the source identifier to the UE in the connected mode in the first cell by using a cell broadcast message or a dedicated message that is output by the output unit 102 or in a random access channel RACH procedure.

In another optional solution, the preset activation condition includes at least one of the following conditions:
  the first base station sends, to the UE, a control instruction used to instruct the UE to enter the low-overhead state;
  no data has been transmitted between the first base station and the UE within first preset duration;
  the first base station determines that a timing advance timer TA timer of the UE expires, or the first base station determines that a TA timer of the UE expires and the TA timer has not run again within second preset duration; or
  the first base station determines that the UE enters a discontinuous reception DRX state, and has not exited the DRX state within third preset duration.

In another optional solution, the processing unit 104 is further configured to:
  send, by using the output unit 102 after determining that the UE enters the low-overhead state, radio resource control RRC configuration information to the UE for use by the UE in the low-overhead state.

In another optional solution, the RRC configuration information includes an RRC configuration index, and the configuration index is used to indicate the RRC configuration information.

In another optional solution, the base station further includes an input unit 101, and the processing unit 104 is further configured to:
  receive, by using the input unit 101 and after determining that the UE enters the low-overhead state, a notification message sent by a second base station to which a second cell belongs, where the notification message carries the source identifier of the UE and a second cell identifier of the second cell in which the UE is currently located, and the second cell is a serving cell on which the UE currently camps; and
  determine, according to the source identifier and the second cell identifier, that the serving cell on which the UE currently camps is the second cell.

In another optional solution, the processing unit 104 is further configured to:
  after determining, according to the source identifier and the second cell identifier, that the serving cell on which the UE currently camps is the second cell, send, by using the output unit 102, the connection context and the source identifier of the UE to the second base station when downlink data of the UE arrives at the first base station, where the second base station is a base station to which the second cell belongs.

In another optional solution, the base station further includes the input unit 101; and the notification message carries verification information of the UE, and the verification information is identity authentication information generated by the UE according to the source identifier and a key that is included in the connection context; and
  the processing unit 104 is further configured to:
  after receiving, by using the input unit 101, the notification message sent by the second base station, determine, according to the source identifier and the verification information, whether the UE is valid UE.

In another optional solution, the base station further includes the input unit 101, and the processing unit 104 is further configured to:
  receive, by using the input unit 101 and after determining that the UE enters the low-overhead state, a transfer request that is for the connection context and that is sent by the second base station to which the second cell belongs, where the transfer request carries the source identifier of the UE, and the second cell is the cell on which the UE currently camps; and
  send, by using the output unit 102, the connection context to the second base station according to the source identifier carried in the transfer request.

In another optional solution, the base station further includes an input unit 101, and the processing unit 104 is further configured to:

send, by using the output unit 102, a paging message to a third base station when downlink data of the UE arrives at the first base station or a paging from a core network device arrives at the first base station, where the third base station and the first base station are base stations belonging to a same paging area range.

The input unit 101 is configured to receive a paging response message of the UE from the third base station, so that the first base station can learn that the UE is currently located in the third base station.

The input unit 101 is further configured to: before the downlink data arrives at the base station, the base station needs to obtain information about a paging parameter of the UE from the core network. The paging parameter includes a paging index of the UE or a DRX cycle of the UE.

It may be understood that, for functions of the units in the base station 10, correspondingly refer to the specific implementations in the method embodiment in FIG. 2. Details are not described herein again.

Referring to FIG. 6, FIG. 6 shows user equipment UE 20 according to an embodiment of the present invention. The UE 20 may include: an input unit 201, an output unit 202, a storage unit 203, and a processing unit 204. In some embodiments of the present invention, the input unit 201, the output unit 202, the storage unit 203, and the processing unit 204 may be connected by using a bus or in another manner. The bus is configured to implement communication connections between these components. The input unit 201 may be specifically a touch panel of the UE, including a touchscreen configured to detect an operation instruction on the touch panel of the UE. The output unit 202 may include a display of the UE, configured to output and display image or data. The storage unit 203 may be a high-speed RAM memory, or may be a non-volatile memory, for example, at least one magnetic storage. Optionally, the storage unit 203 may be at least one storage apparatus that is far away from the processing unit 204. As shown in FIG. 6, as a computer storage medium, the storage unit 203 may include an operating system, a network communications module, a user interface module, and a data processing program.

The processing unit 204 of the UE in FIG. 6 invokes program code in the storage unit 203, to perform the following operations:

receiving, by using the input unit 201, a source identifier that is allocated by a first base station to which a first cell belongs, where the source identifier includes a first UE identifier that uniquely identifies the UE in a cell of the first base station;

enabling the UE to enter a low-overhead state when a preset activation condition is satisfied, where in the low-overhead state, the UE stores a connection context of the UE in a connected mode, and camps on a cell according to a cell reselection criterion during movement; and reporting, by using the output unit 202 and when a first preset condition is satisfied, the source identifier to a second base station to which a second cell belongs, where the second cell is a serving cell on which the UE currently camps.

In an optional solution, the source identifier includes a first cell identifier that identifies the first cell and the first UE identifier that uniquely identifies the UE in the first cell, and the first cell identifier includes at least one of an E-UTRAN cell global identifier ECGI, a physical cell identifier PCI, or a cell identifier that includes an identifier of an area and an identifier of the first cell in the area; or the source identifier includes a first base station identifier that uniquely identifies the first base station and the first UE identifier that uniquely identifies the UE in the first base station.

In another optional solution, the preset activation condition includes at least one of the following conditions:

the UE receives, from the first base station, a control instruction used to instruct to enter the low-overhead state;

the UE leaves the first cell;

no data has been transmitted between the UE and the first base station within first preset duration;

a timing advance timer TA timer of the UE expires, or a TA timer of the UE expires and the TA timer has not run again within second preset duration; or the UE enters a discontinuous reception DRX state, and has not exited the DRX state within third preset duration.

In another optional solution, the processing unit 204 is further configured to:

after the UE enters the low-overhead state when the preset activation condition is satisfied, enable the UE to exit the low-overhead state when a second preset condition is satisfied, where the second preset condition includes:

the serving cell on which the UE currently camps changes; or the serving cell on which the UE currently camps goes beyond a specified cell set range; or the serving cell on which the UE currently camps and the first cell do not belong to a same preset area or a same base station; or the UE sends the source identifier to the second base station and receives an access reject indication for the source identifier from the second base station; or the UE reads a system information broadcast of the second cell, and the system information broadcast does not carry an indication that access of the UE in the low-overhead state is allowed; or the UE needs to send uplink data; or the UE obtains a reference signal measurement result, and a result of comparison between the reference signal measurement result and a first predetermined threshold conforms to a preset result.

In another optional solution, that the processing unit 204 is configured to enable the UE to exit the low-overhead state when a second preset condition is satisfied is specifically: clearing the connection context and enabling the UE to enter an idle mode when the second preset condition is satisfied.

In another optional solution, the first preset condition includes:

the serving cell on which the UE currently camps changes; or the second cell on which the UE currently camps goes beyond the specified cell set range; or the second cell on which the UE currently camps and the first cell do not belong to a same preset area or a same base station; or the UE needs to send uplink data.

In another optional solution, the processing unit 204 is further configured to:

before reporting, by using the output unit 202 and when the first preset condition is satisfied, the source identifier to the second base station to which the second cell belongs, receive and read a system information broadcast of the second cell by using the input unit 201, and if the system information broadcast carries an indication that access of the UE in the low-overhead state is allowed, determine, according to the access indication, to send the source identifier to the second base station by using the output unit 202.

In another optional implementation, before the source identifier is reported, by using the output unit 202, to the second base station to which the second cell belongs, a reference signal measurement result is obtained by using the input unit 201 and compared with a first predetermined threshold, and it is determined, according to a result of the comparison, to send the source identifier to the second base station by using the output unit 202.

In another optional solution, the processing unit 204 is further configured to: before reporting, by using the output unit 202 and when the first preset condition is satisfied, the source identifier to the second base station to which the second cell belongs, send a random access preamble within a preset range to the second base station by using the output unit 202, where the random access preamble within the preset range is used to indicate that the source identifier needs to be sent to the second base station or a message of a length that is greater than a preset length threshold needs to be sent to the second base station;

receive, by using the input unit 201, a preset-size transmission resource that is allocated by the second base station and that is used to transmit the source identifier; and send, by using the output unit 202, the source identifier to the second base station by using the transmission resource.

In another optional solution, the random access preamble within the preset range is a predefined preamble or a received preamble configured by the second base station.

In another optional solution, that the processing unit 204 is configured to report the source identifier to a second base station to which a second cell belongs is specifically:

sending a random access preamble to the second base station by using the output unit 202;

receiving, by using the input unit 201, a dedicated UE identifier sent by the second base station and a transmission resource that is sent by the second base station, allocated according to the random access preamble, and used to transmit the source identifier, where the dedicated UE identifier is an identifier that uniquely identifies the UE in the second cell;

sending, by using the output unit 202, the source identifier to the second base station by using the transmission resource;

receiving, by using the input unit 201, acknowledgment information that is sent by the second base station and that includes the source identifier; and determining, according to the acknowledgment information, whether to apply the dedicated UE identifier.

In another optional solution, that the processing unit 204 is configured to determine, according to the acknowledgment information, whether to apply the dedicated UE identifier is specifically:

skipping applying, by the processing unit 204, the dedicated UE identifier according to the acknowledgment information; or applying, by the processing unit 204, the dedicated UE identifier according to the acknowledgment information, and exiting the low-overhead state; or applying, by the processing unit 204, the dedicated UE identifier according to the acknowledgment information, and remaining in the low-overhead state; or applying, by the processing unit 204, the dedicated UE identifier and exiting the low-overhead state according to an instruction that is carried in the acknowledgment information and that is used to instruct the UE to exit the low-overhead state.

In another optional solution, the processing unit 204 is further configured to:

after the UE applies the dedicated UE identifier, update a key in the connection context according to a cell identifier of the currently camped serving cell.

In another optional solution, the source identifier further includes verification information, and the verification information is identity authentication information generated by the UE according to the source identifier and an updated key.

In another optional solution, the processing unit 204 is further configured to:

after the UE enters the low-overhead state when the preset activation condition is satisfied, perform paging listening by using the source identifier.

In another optional solution, the processing unit 204 is further configured to:

receive, by using the input unit 201, radio resource control RRC configuration information sent by the first base station, where the RRC configuration information includes an RRC configuration index, and the configuration index is used to indicate the RRC configuration information; and enable the UE to use the RRC configuration information in the low-overhead state.

In another optional solution, that the processing unit 204 is configured to report, when a first preset condition is satisfied, the source identifier to a second base station to which a second cell belongs is specifically:

reporting, by using the output unit 202, the source identifier including the RRC configuration index to the second base station to which the second cell belongs, so that the second base station determines, according to the RRC configuration index, the RRC configuration information used by the UE.

In another optional solution, the first preset condition is that the UE needs to send uplink data, and that the processing unit 204 is configured to report the source identifier to a second base station to which a second cell belongs is specifically:

reporting, by using the output unit 202, an uplink data indication including the source identifier to the second base station to which the second cell belongs.

In another optional solution, the first preset condition is that the UE needs to send uplink data, and that the processing unit 204 is configured to report the source identifier to a second base station to which a second cell belongs is specifically:

reporting, according to indication information of the second base station by using the output unit 202, a long source identifier or a short source identifier to the second base station to which the second cell belongs.

It may be understood that, for functions of the units in the user equipment UE 20, correspondingly refer to the specific implementations in the method embodiment in FIG. 3A and FIG. 3B. Details are not described herein again.

Referring to FIG. 7, FIG. 7 shows a base station 30 according to an embodiment of the present invention. The base station 30 is a second base station, and the base station 30 includes an input unit 301, an output unit 302, a storage unit 303, and a processing unit 304. In some embodiments of the present invention, the input unit 301, the output unit 302, the storage unit 303, and the processing unit 304 may be connected by using a bus or in another manner. FIG. 7 shows bus connection as an example. The processing unit 304 invokes program code in the storage unit 303, to perform the following operations:

receiving, by using the input unit 301, a source identifier that is reported by user equipment UE in a low-overhead state, where in the low-overhead state, the UE stores a connection context of the UE in a connected mode, and camps on a cell according to a cell reselection criterion during movement, a first cell is a serving cell when the UE enters the low-overhead state, the second cell is a current serving cell of the UE, and the source identifier includes a first UE identifier that identifies the UE in a first base station to which the first cell belongs; and sending the first UE identifier to the first base station according to the source identifier by using the output unit 302, to notify the first base station that the current serving cell of the UE is the second cell.

In an optional solution, the source identifier includes a first cell identifier that identifies the first cell and the first UE identifier that uniquely identifies the UE in the first cell, and the first cell identifier includes at least one of an E-UTRAN cell global identifier ECGI, a physical cell identifier PCI, or a cell identifier that includes an identifier of an area and an identifier of the first cell in the area; or the source identifier includes a first base station identifier that uniquely identifies the first base station and the first UE identifier that uniquely identifies the UE in the first base station.

In another optional solution, the source identifier further includes indication information, and the indication information is used to notify the second base station that the UE is in the low-overhead state.

In another optional solution, the processing unit 304 is further configured to:

before receiving, by using the input unit 301, the source identifier that is reported by the user equipment UE in the low-overhead state, send a system information broadcast by using the output unit 302, where the system information broadcast carries an indication that access of the UE in the low-overhead state is allowed, so that the UE determines, according to the access indication, whether to send the source identifier to the second base station.

In another optional solution, the processing unit 304 is further configured to: before receiving, by using the input unit 301, the source identifier that is reported by the user equipment UE in the low-overhead state, receive, by using the input unit 301, a random access preamble sent by the UE; and when the random access preamble falls within a preset range, allocate a preset-size transmission resource to the UE by using the output unit 302, so that the UE sends the source identifier by using the transmission resource.

In another optional solution, the random access preamble within the preset range is a predefined preamble or a received preamble configured by the second base station.

In another optional solution, that the processing unit 304 is configured to receive, by using the input unit 301, a source identifier that is reported by user equipment UE in a low-overhead state is specifically:

receiving, by using the input unit 301, a random access preamble that is sent by the user equipment UE in the low-overhead state;

allocating, to the UE according to the random access preamble by using the output unit 302, a dedicated UE identifier and a transmission resource that is used to transmit the source identifier, where the dedicated UE identifier is an identifier that uniquely identifies the UE in the second cell;

receiving, by using the input unit 301, the source identifier by using the transmission resource; and sending acknowledgment information including the source identifier to the UE by using the output unit 302.

In another optional solution, that the processing unit 304 sends acknowledgment information including the source identifier to the UE by using the output unit 302 is specifically:

sending, to the UE by using the output unit 302, an acknowledgment message that includes the source identifier and that carries an instruction used to instruct the UE to exit the low-overhead state, so that the UE applies the dedicated UE identifier and exits the low-overhead state according to the instruction.

In another optional solution, that the processing unit 304 sends the first UE identifier to the first base station according to the source identifier by using the output unit 302 is specifically:

sending a notification message to the first base station according to the source identifier by using the output unit 302, where the notification message carries the source identifier of the UE and a second cell identifier of the second cell in which the UE is currently located, so that the first base station determines, according to the source identifier and the second cell identifier, that the serving cell on which the UE currently camps is the second cell.

In another optional solution, the processing unit 304 is further configured to:

after sending the first UE identifier to the first base station according to the source identifier by using the output unit 302, receive an uplink data indication that is sent by the UE and that includes the source identifier;

send a transfer request for the connection context to the first base station by using the output unit 302, where the connection context is a connection context that is of the UE in the connected mode and that is stored by the first base station when the UE enters the low-overhead state, and the transfer request of the connection context carries the source identifier of the UE; and receive, by using the input unit 301, the connection context transferred by the first base station, and establish a connection to the UE according to the connection context.

In another optional solution, the processing unit 304 is further configured to:

after receiving, by using the input unit 301, the connection context transferred by the first base station, send a re-allocated source identifier to the UE by using the output unit 302, where the re-allocated source identifier includes a second UE identifier that identifies the UE in the second base station; and send an instruction to the UE by using the output unit 302 to instruct the UE to exit the low-overhead state.

In another optional solution, the processing unit 304 is further configured to:

after sending the first UE identifier to the first base station according to the source identifier by using the output unit 302, receive, by using the input unit 301, the connection context and the source identifier of the UE that are sent by the first base station; and determine configuration information of the UE according to the received connection context and source identifier, and trigger uplink access of the UE according to the source identifier.

In another optional solution, that the processing unit 304 is configured to trigger uplink access of the UE according to the source identifier is specifically:

paging the UE by using the source identifier; or determining the dedicated UE identifier of the UE according to the source identifier, and sending an uplink access command to the UE by using the dedicated UE identifier; or determining the dedicated UE identifier of the UE according to the source identifier, and paging the UE by using the dedicated UE identifier.

In another optional solution, the source identifier further includes a radio resource control RRC configuration index, and the processing unit 304 is further configured to:

after receiving, by using the input unit 301, the source identifier that is reported by the user equipment UE in the low-overhead state, determine, according to the RRC configuration index, RRC configuration information used by the UE.

In another optional solution, that the processing unit 304 is configured to send the first UE identifier to the first base station according to the source identifier by using the output unit 302 is specifically:

sending, by using the output unit 302, the source identifier to the first base station according to the source identifier by using an interface between the second base station and the first base station; or sending, by using the output unit 302, the source identifier to the first base station according to the source identifier by using a core network.

It may be understood that, for functions of the units in the base station 30, correspondingly refer to the specific implementations in the method embodiment in FIG. 4A and FIG. 4B. Details are not described herein again.

It should be noted that the foregoing method embodiments of the present invention may be applied to a processor, or implemented by a processor. The processor may be an integrated circuit chip having a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and schematic logical diagrams that are disclosed in the embodiments of the present invention. The general-purpose processor may be a microprocessor or the processor may be any normal processor, or the like. Steps of the methods disclosed with reference to the embodiments of the present invention may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present invention may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory in the systems and methods described in this specification includes but is not limited to these memories and any other memory of a proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   receiving, when a terminal being in a connected mode, a first message from a first base station, wherein the first message comprises a long source identifier and a short source identifier, wherein each of the long source identifier and the short source identifier identifies the terminal;
   causing the terminal to enter a low-overhead state, wherein the low-overhead state is a state in which the terminal stores a connection context of the terminal, and camps on a serving cell according to a cell reselection criterion during movement of the terminal;
   receiving indication information from a second base station; and
   determining, according to the indication information, which one of the long source identifier and the short source identifier is to be sent to the second base station; and
   sending the long source identifier or the short source identifier to the second base station.

2. The method according to claim 1, wherein the first message further comprises a control instruction indicating the terminal to enter the low-overhead state.

3. The method according to claim 1, wherein sending the long source identifier or the short source identifier to the second base station comprises:
   in response to a preset condition being satisfied, sending the long source identifier or the short source identifier to the second base station;
   wherein the preset condition comprises:
   a second cell area on which the terminal currently camps does not belong to a specified cell set; or
   a second cell on which the terminal currently camps and a first cell which belongs to the first base station do not belong to a same preset area or a same base station; or
   the terminal needs to send uplink data.

4. The method according to claim 1, wherein the indication information is a system message.

5. The method according to claim 1, wherein the long source identifier and the short source identifier are independent of each other; or
   the short source identifier originates from a portion of the long source identifier.

6. A non-transitory computer-readable storage medium, comprising executable instructions, when executed by one or more processors of a terminal, cause the terminal to perform the steps of:
   receiving, when the terminal being in a connected mode, a first message from a first base station, wherein the first message comprises a long source identifier and a short source identifier, wherein each of the long source identifier and the short source identifier identifies the terminal;
   causing the terminal, to enter a low-overhead state, wherein the low-overhead state is a state in which the terminal stores a connection context of the terminal, and camps on a serving cell according to a cell reselection criterion during movement of the terminal;
   receiving indication information from a second base station; and
   determining, according to the indication information, which one of the long source identifier and the short source identifier is to be sent to the second base station; and
   sending the long source identifier or the short source identifier to the second base station.

7. The non-transitory computer-readable storage medium according to claim 6, wherein the first message further comprises a control instruction indicating the terminal to enter the low-overhead state.

8. The non-transitory computer-readable storage medium according to claim 6, wherein in response to a preset condition being satisfied, sending the long source identifier or the short source identifier to the second base station;
   wherein the preset condition comprises:
   a second cell on which the terminal currently camps does not belong to the specified cell set; or
   a second cell on which the terminal currently camps and a first cell which belongs to the first base station do not belong to a same preset area or a same base station; or
   the terminal needs to send uplink data.

9. The non-transitory computer-readable storage medium according to claim 6, wherein the indication information is a system message.

10. The non-transitory computer-readable storage medium according to claim 6, wherein the long source identifier and the short source identifier are independent of each other; or
    the short source identifier originates from a portion of the long source identifier.

11. A method, comprising:
    sending, by a first base station, a first message to a terminal in a connected mode, wherein the first message comprises a long source identifier and a short source identifier, wherein each of the long source identifier and the short source identifier identifies the terminal; and
    keeping, by the first base station, a connection context of the terminal in a low-overhead state of the terminal, wherein the low-overhead state is a state in which the terminal stores the connection context of the terminal, and camps on a serving cell according to a cell reselection criterion during movement of the terminal;
    receiving, by the first base station, a second message from a second base station, wherein the second message carries the long source identifier or the short source identifier, and carries a second cell identifier of a second cell, and the second cell is a serving cell on which the terminal currently camps; and determining, according to the long source identifier or the short source identifier, and according to the second cell identifier, that the serving cell on which the terminal currently camps is the second cell.

12. The method according to claim 11, wherein the first message further comprises a control instruction indicating the terminal to enter the low-overhead state.

13. A communications system, comprising: a first base station and a second base station; wherein the first base station is configured to send a first message to a terminal in a connected mode, wherein the first message comprises a long source identifier and a short source identifier, wherein each of the long source identifier and the short source identifier identifies the terminal; and the second base station is configured to send indication information to the terminal in a low-overhead state, receive the long source identifier or the short source identifier, and send a second message to the first base station, wherein the second message carries the received source identifier and a cell identifier of a second cell, the indication information is usable for determining which one of a long source identifier and a short source identifier is to be reported sent to the second base station, wherein the low-overhead state is a state in which the terminal stores a connection context of the terminal, and camps on a serving cell according to a cell reselection criterion during movement of the terminal.

14. The system according to claim 13, wherein the first message further comprises a control instruction indicating the terminal to enter the low-overhead state.

15. The system according to claim 13, wherein the indication information is a system message.

16. The system according to claim 13, wherein the long source identifier and the short source identifier are independent of each other; or the short source identifier originates from a portion of the long source identifier.

17. The system according to claim 13, further comprising: the terminal, wherein the terminal is configured to:

receive, when the terminal being in a connected mode, the first message from the first base station;

enter the low-overhead state; and send, according to the indication information, the long source identifier or the short source identifier to the second base station.

18. The system according to claim 17, wherein the terminal is further configured to:

receive the indication information from the second base station; and determine, according to the indication information, which one of the long source identifier and the short source identifier is to be reported to the second base station.

* * * * *